United States Patent
Plasek et al.

(10) Patent No.: US 7,599,949 B1
(45) Date of Patent: Oct. 6, 2009

(54) DATABASE MANAGEMENT SYSTEM AND METHOD FOR MAINTAINING A DATABASE IN A RANGE SENSITIVE MANNER

(75) Inventors: James M. Plasek, Shoreview, MN (US); Michael S. Jende, White Bear Lake, MN (US); Kelsey L. Bruso, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 454 days.

(21) Appl. No.: 10/836,537

(22) Filed: Apr. 30, 2004

(51) Int. Cl.
*G06F 17/30* (2006.01)

(52) U.S. Cl. .................................. 707/101; 707/205

(58) Field of Classification Search ............ 707/1, 707/2, 100, 101, 102, 201, 203, 200, 205, 707/6; 709/212; 711/100; 717/144
See application file for complete search history.

(56) References Cited

U.S. PATENT DOCUMENTS

| | | | |
|---|---|---|---|
| 5,557,786 A | | 9/1996 | Johnson, Jr. |
| 5,644,763 A | * | 7/1997 | Roy ........................... 707/101 |
| 5,752,243 A | * | 5/1998 | Reiter et al. ................... 707/3 |
| 6,055,539 A | * | 4/2000 | Singh et al. ................. 707/102 |
| 6,347,318 B1 | | 2/2002 | Rokicki |
| 6,505,205 B1 | * | 1/2003 | Kothuri et al. ............... 707/100 |
| 6,591,269 B1 | | 7/2003 | Ponnekanti |
| 6,668,263 B1 | | 12/2003 | Cranston et al. |
| 6,675,157 B1 | | 1/2004 | Mitchell |
| 6,675,173 B1 | | 1/2004 | Shadmon |
| 7,430,549 B2 | * | 9/2008 | Zane et al. ..................... 707/3 |
| 7,493,352 B2 | * | 2/2009 | O'Neil et al. ............... 707/205 |
| 2008/0168103 A1 | * | 7/2008 | Rakic ......................... 707/200 |

* cited by examiner

*Primary Examiner*—Mohammad Ali
*Assistant Examiner*—Marc R Filipczyk
(74) *Attorney, Agent, or Firm*—Robert P. Marley; Shumaker & Seiffert

(57) ABSTRACT

A system and method is provided for inserting an ascending or descending sequence of data records into a database table represented by a tree structure. A search is performed to locate a node of the tree that includes the insertion point for a record in the sequence. If the node must be divided to store the record, it is determined whether division of the node at the insertion point will prevent a subsequently received record in the sequence from being stored on the same node with other records in the sequence irrespective of the storage space available on that node. If so, the node division is performed so that a record that is not in the sequence but that is adjacent to the insertion point is maintained on the same node as the other records in the sequence.

23 Claims, 18 Drawing Sheets

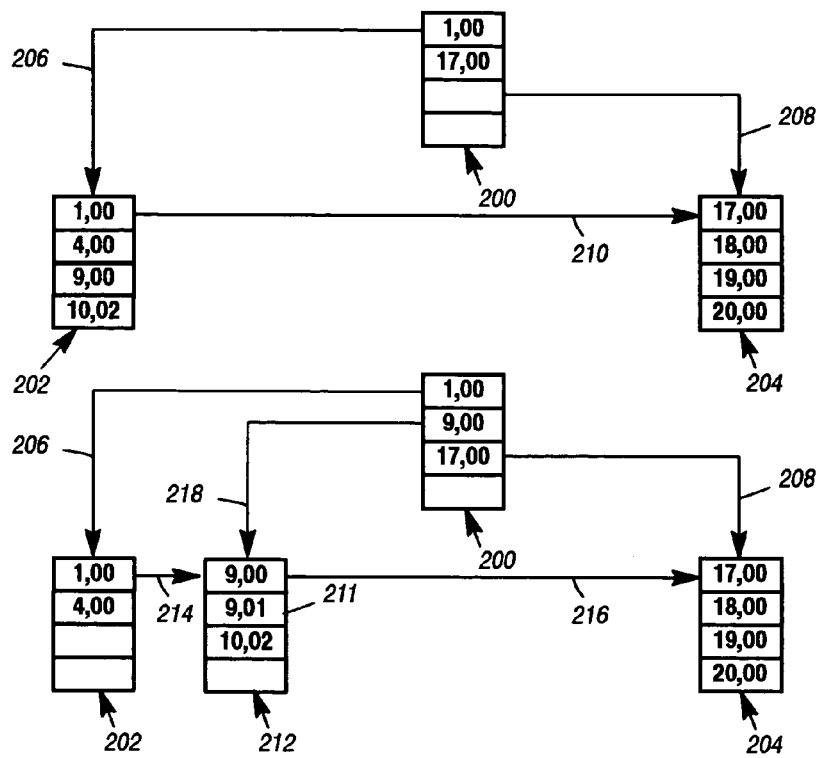
*Figure 2A*
*Figure 2B*
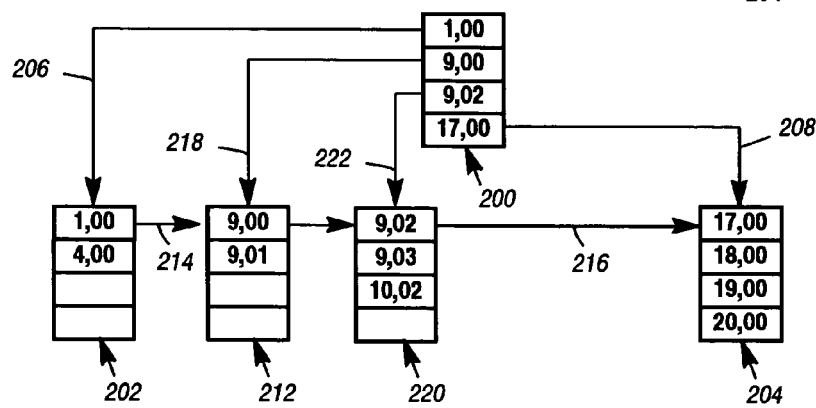
*Figure 2C*
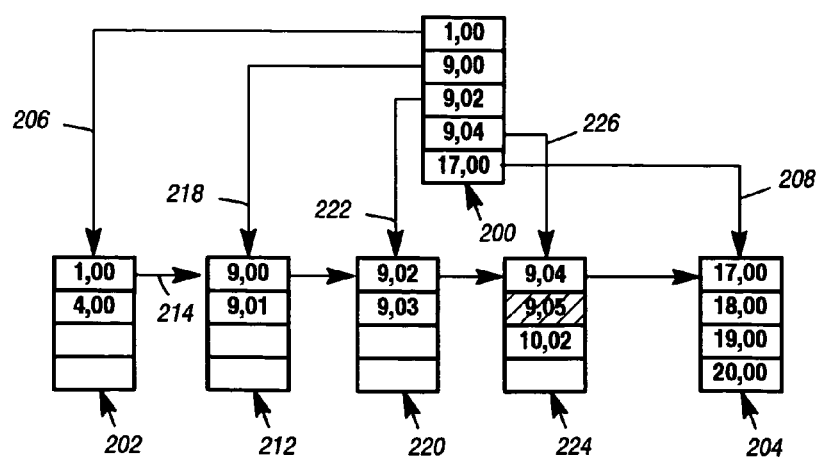
*Figure 2D*

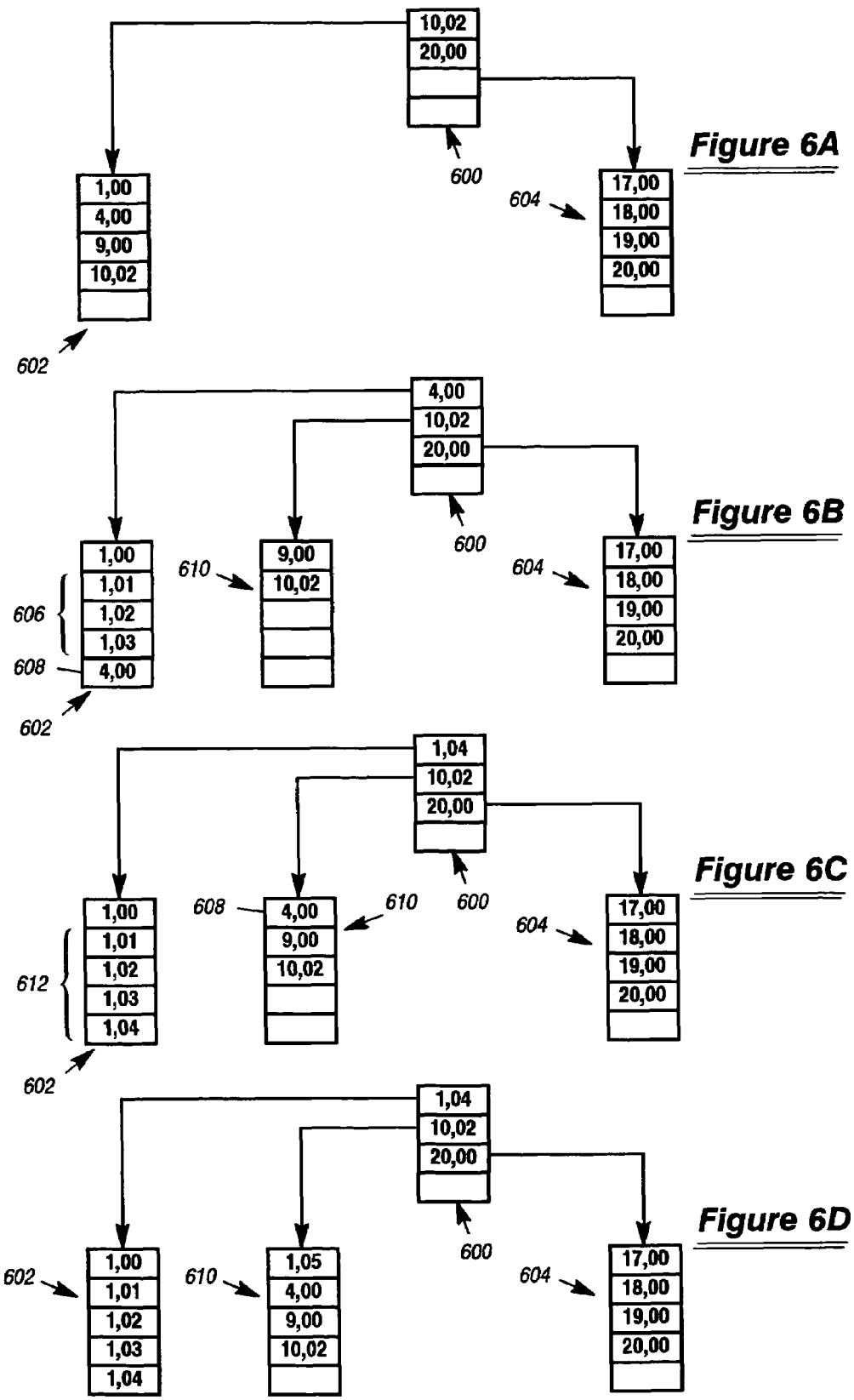

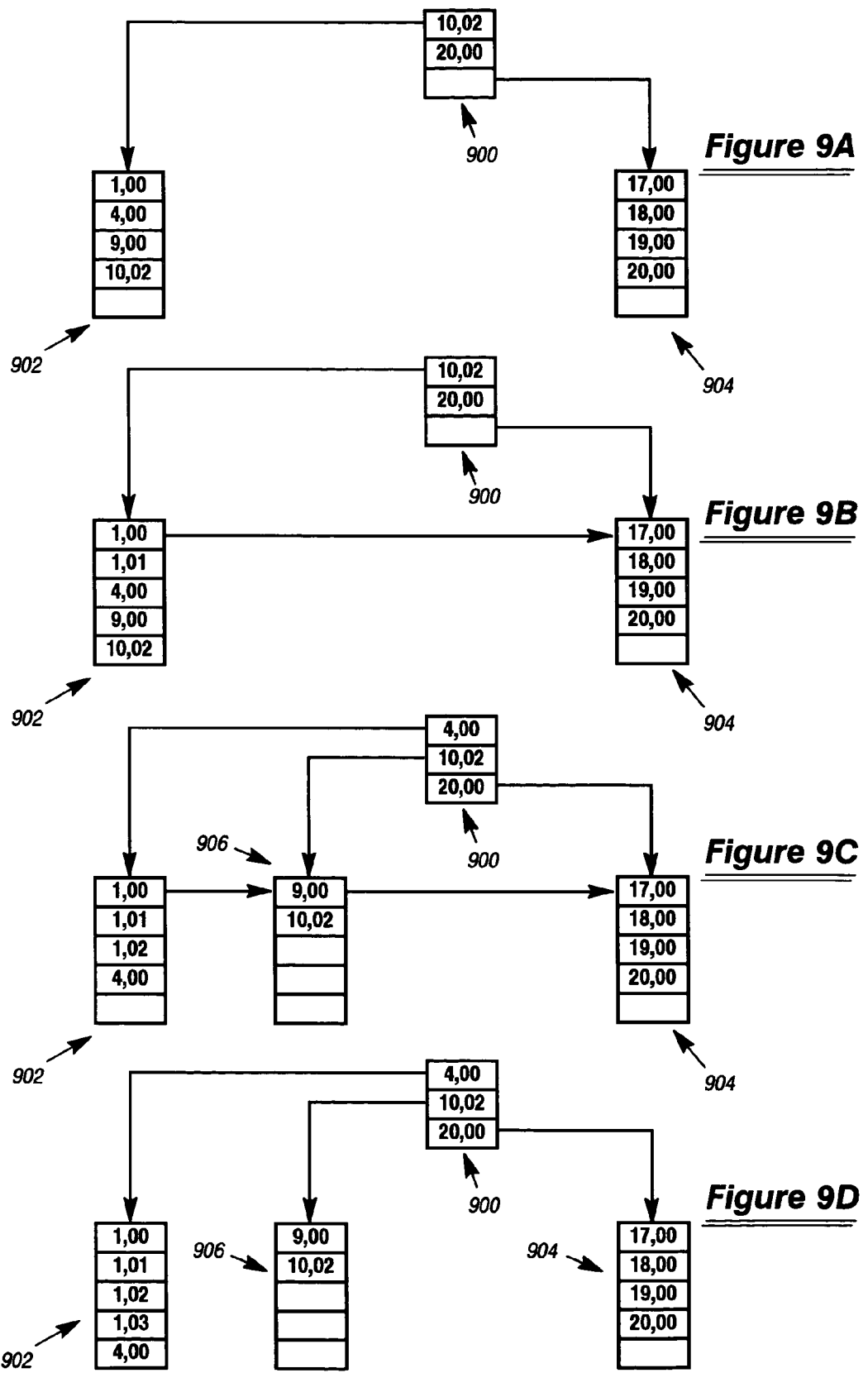

DATABASE MANAGEMENT SYSTEM AND METHOD FOR MAINTAINING A DATABASE IN A RANGE SENSITIVE MANNER

FIELD OF THE INVENTION

This invention relates to a system and method for constructing a database table; and, more specifically, relates to a mechanism for adding sequences of records to a database table in an efficient manner.

BACKGROUND OF THE INVENTION

Computers are used today to store large amounts of data. Such information is often stored in information storage and retrieval systems referred to as databases. This information is stored and retrieved from a database using an interface known as a database management system (DBMS).

One type of DBMS is called a Relational Database Management System (RDBMS). An RDBMS employs relational techniques to store and retrieve data. Relational databases are organized into tables, wherein tables include both rows and columns, as is known in the art. Each row of a table may be referred to as a record.

One type of data structure used to implement the tables of a database is a B-tree, and its variant, a $B^+$-tree. These tree structures are used to implement primary keys, secondary indexes, clustering indexes, non-clustering indexes, unique constraints, and the like.

A B-tree can be viewed as a hierarchical index. The root node is at the highest level of the tree, and stores one or more pointers, each pointing to a child of the root node. Each of these children may, in turn, store one or more pointers to children, and so on. At the lowest level of the tree are the leaf nodes, which have no children. The leaf nodes may contain data records or pointers or other indicia pointing to data records.

In addition to the pointers to child nodes, each of the non-leaf nodes of the B-tree also stores at least one key value used to search the tree for a particular data record. For instance, assume a node stores a first key value, and first and second pointers that each point to a child node. According to one exemplary organizational structure, the first pointer may be used to locate the child node storing one or more key values that are less than the first key value, whereas the second pointer is used to locate the child storing one or more key values greater than, or equal to, the first key. Using the key values and the pointers to search the tree in this manner, a node may be located that stores a record associated with a particular key value that is used as the search key.

Rows, or records, of a table, are generally stored within a logical container referred to as a file. Files reside on a persistent storage media and may contain all of the records of one or more tables. In the art, a file may be divided into equal sized portions called pages. When a database table is represented by a tree structure in the manner discussed above, each page of the file that stores the database corresponds to a node of the tree. Thus, in the following discussion, the terms "node" and "page" are used interchangeably.

DBMS applications typically build B-trees according to the following process. The DBMS application obtains a first record having a first key value that is to be added to new B-tree. A root node is created that points to a leaf node, and the record is stored within the leaf node. When a second record is received, the key value stored within the root node and the second record will be used to determine whether the second record will be stored within the existing leaf node or within a newly created leaf node. The point of insertion will be selected so that all records are stored in a sort order based on the key values. Similarly, as additional records are received, the records are added to the tree by traversing the tree structure using the key values to locate the appropriate location of insertion, then adding leaf nodes as necessary. Whenever it is determined that the root or an intermediate node has too many children, that node is divided into two nodes, each having some of the children of the original node. Similarly, whenever it is determined that a record must be added to a leaf node that is too full to receive the record, the leaf node must be split to accommodate the new record.

When a leaf node must be divided to make room for an additional data record, prior art systems generally split the leaf node at the logical or physical halfway point. If the logical halfway point is used to make the division, two leaf nodes are created, with each storing half of the records of the original leaf node. If the physical halfway point is employed, each of the two leaf nodes stores approximately half of the data stored within the original leaf nodes. For example, assume an original leaf node includes four records, with the first record being roughly three times larger than any of the other three records. If the original leaf node is to be divided into two leaf nodes at the physical halfway point, a first leaf node will store the first record, and a second leaf node will store the remaining three records.

The foregoing prior art method of dividing a leaf node at a halfway point to insert a data record generally provides results in satisfactory memory usage when unsorted records are received in a random manner. However, this approach does not work well when a series of sequential records are received. For example, assume a sequence of sequential records in an ascending sort order is received. A leaf node is located that contains the insertion point for this sequence of records. Assuming that leaf node is full, the prior art method will divide that node at a halfway point into a first and a second node. Assuming the insertion point for the sequence is located within the second node, the first node remains only half full. Assume, further, that after a portion of the sequence is stored within the second node, that node becomes full, and is therefore divided in half to produce a third node. Because the sequence continues where it left off, the insertion of additional records occurs within the third node, leaving the second node only half full. The process of splitting nodes in this manner continues as the sequence is processed, resulting in nodes that are only half full. That is, the "load factor" of the nodes is only 50%, resulting in inefficient use of storage space and causing subsequent search operations to be more time-consuming.

U.S. Pat. No. 5,644,763 to Roy provides an alternative approach to the above-described prior art mechanism. According to this alternative, in some instances wherein a sequence of records are received in an ascending order, a leaf node that includes the insertion point will be divided at that insertion point instead of at a halfway point. This allows the newly-created to nodes to be filled such that the load factor increases above 50%. However, the method disclosed in Roy is only effective if records sorted within an ascending order are added to the end of an existing sequence of records. When records are being added in descending sort order, or are added to a beginning of a sequence of records, the load factor can drop significantly below 50%. This results in even poorer performance than was provided by the alternative prior art method. This can be appreciated by the following example.

Assume that a descending sequence of records is being inserted into a tree structure according to the method described in the Roy patent. A node is located that includes the insertion point for this sequence. The insertion point is not located at the edge of a node. After several records in the descending sequence are stored to this node, the node becomes full. According to Roy, this node will be divided at the insertion point into two nodes, with a first node storing the records in the sequence, and the other node storing other records. These two nodes are linked to their parent node via the index values of the first records in each of the nodes.

Next, another record in the descending sequence is received. This record will, by definition, have an index value less than the index values of the other records in the sequence that have been stored within the tree. Because of the way the nodes are linked to the parent node, the insertion point for this record will not be located on the first node with the other records in the sequence, but will instead be located on the second node. After one or more additional records in the sequence are received, the second node becomes full and another division is performed. One of the resulting nodes contains the records in the sequence, and the other node stores those records not in the sequence. The process is then repeated again. This causes the load factor to trend downward, since the nodes storing records included in the sequence are only partially full, and can never store any additional records.

Although the foregoing example discusses a situation involving an insertion point that is not at the edge of a node, a similar situation occurs when the insertion point is at the edge of a node. Moreover, although the above example relates to a case wherein index values from first records in the nodes are used to associate parent and child nodes, a similar problem exists when index values from the last records in the nodes are used to make this association when an ascending sequence of records is being received.

Thus, what is needed is a system and method for inserting sorted data into a hierarchical data structure in a manner that utilizes storage space more efficiently. This system and method is optimally suited for storing data sorted both in an ascending and a descending order, and for storing data both to the beginning and the end of an existing sequence of data.

SUMMARY OF THE INVENTION

The current invention provides an improved system and method for inserting a sequence of data into a hierarchical data structure. In one embodiment, the data structure is a B-tree or a B+-tree, and the data comprises a sequence of data records. According to this embodiment, when a data record is received for insertion into the tree, the tree is searched to locate a node of the tree containing the insertion point for the record. If the located node includes enough available storage space to store the record, the insertion may be completed without performing special processing. If, however, not enough space is available to perform the insertion, the node must be divided. In this case, the division is performed in a manner that guarantees that a next record in the sequence can be inserted into the tree in a manner that optimally utilizes storage space, thereby increasing the load factor of the tree.

According to one aspect of the invention, when a node must be divided to receive a record included within a sequence, a determination is made as to whether division at the insertion point will lower the load factor. This involves determining how the tree will be configured after the division produces a first node containing records in the sequence, and a second node containing unrelated records. If, after the node division has been completed, a subsequently received record in the sequence cannot be stored on the first node with other records in the sequence even though storage space is available to accommodate this record, an undesirable situation has resulted that will trend the load factor downward. In this type of non-optimal situation, the first node must not be divided at the insertion point. It must instead be divided so that the record that is adjacent to the insertion point and also adjacent to the last received record in the sequence ("adjacent record") is maintained on the same node as the other records in the sequence. If the division is performed in this manner, the next record in the sequence can be stored on the same page with other records in the sequence assuming storage space permits. When this node becomes full, division of the node at the insertion point will now produce optimal results.

The foregoing method is effective in trending the load factor towards 100 percent regardless of whether parent nodes are linked to child nodes via the first or last records stored on the nodes, and irrespective of whether a sequence is an ascending or descending sequence.

According to one embodiment, means is provided for detecting that a sequence of records is being received as records are being inserted into the tree. This detection may occur, for example, by comparing the index values from two consecutively processed records. The detection may instead occur by comparing an index value of a record that is being inserted to the index values of the records at the insertion point. When a sequence is detected, processing occurs in the manner discussed above so that node divisions are completed to allow the load factor to trend towards 100 percent.

In an alternative embodiment, pre-processing is performed to detect that a sequence is about to be inserted into the tree. According to this method, the cumulative size of all records in the sequence is known before insertion of any record in the sequence begins. In this embodiment, the following processing guidelines may be used to perform the sequence insertion. If all records in the sequence can be inserted onto a node without dividing the node, the insertion is completed without taking into account special considerations regarding sequence processing. If division of the node is required, it is determined whether, after division of the node at the insertion point, all records in the sequence can be inserted onto one of the resulting pages along with the adjacent record. If so, the insertion is performed in this manner. If, instead, one of the resulting nodes has storage space available to accommodate the records of the sequence but not the adjacent record, the insertion is performed to store the adjacent record on a node different from that storing the sequence. Finally, if after division of the node, the entire sequence cannot be stored on one of the resulting nodes, the sequence is stored across at least two nodes, with additional nodes being created, if necessary, to accommodate the records in the sequence. The adjacent record is stored on the same node as that storing the last record in the sequence. If processing of the sequence occurs in the foregoing manner, later received records that are a continuation of the sequence may be stored to the tree in an optimal manner.

As discussed above, the inventive system and method described herein provides a mechanism for insertion sequence data into a hierarchical data structure. The exemplary embodiments focus on the invention system and method as it may be employed within a database management system. However, the invention may be adapted for use with knowledge base systems, decision support systems, and data warehouses. In general, any other type of system that uses a B-tree or B+ tree as its data structure may usefully employ the invention. This may include spell checkers, spreadsheets, or any other similar application maintaining sorted data.

In one embodiment, the invention comprises a computer-implemented method for inserting a sequence of records into a tree structure having multiple nodes. The method includes receiving a record, locating a node that includes an insertion point for the record, and storing the record on the located node if sufficient storage space is available. If sufficient storage space is not available, the located node is divided to form two nodes, one of which will store the record. The located node is divided in a manner that ensures that a maximum number of records will reside on each of the two nodes regardless of whether the sequence including the record is an ascending or a descending sequence.

In another embodiment, a system is disclosed for managing a tree structure that stores data records. The system includes a storage device for storing multiple pages included in the tree structure, and a processor coupled to the storage device to receive a data record. The processor locates an insertion point within one of the pages at which to store the data record based on a searchable field in the data record. If the located page does not include sufficient storage space to store the data record, and further if the data record is included within a sequence of data records based on the searchable field, the processor divides the located page to obtain at least two pages. The division is completed in a manner that ensures that the data record, and any subsequently received data records in the sequence, may be stored to the pages in a manner that maximizes utilized storage space within the pages regardless of whether the sequence is an ascending or a descending sequence.

According to another aspect of the invention, a system for managing records of a database table is described. The database table is represented by a tree structure having multiple nodes. The system includes means for receiving a record, and locating a node that includes the insertion point for the record. The system further includes means for determining whether the located node must be divided to store the record, as well as means for dividing the located node so that either an ascending or a descending sequence of records that includes the received record may be stored on the resulting nodes.

Other scopes and aspects of the invention will be apparent to those skilled in the art from the following description and the accompanying drawings.

BRIEF DESCRIPTION OF THE DRAWINGS

FIGS. 2A through 2D are tree diagrams illustrating insertion of an ascending sequence of records into a tree according to one prior art approach.

FIGS. 6A through 6D are tree diagrams illustrating insertion of an ascending sequence of records into a tree according to one embodiment of the current invention.

FIGS. 9A through 9F are tree diagrams illustrating insertion of an ascending sequence of records into a tree according to another embodiment of the invention.

DETAILED DESCRIPTION OF THE DRAWINGS

The following description provides exemplary embodiments of the current invention, which is a system and method for building a hierarchical data structure. The exemplary embodiments focus on the invention system and method as it may be employed within a database management system. However, the invention may be adapted for use with hierarchical database management systems, knowledge base systems, decision support systems, and data warehouses. In general, any other type of system that uses a B-tree or B$^+$ tree as its data structure may usefully employ the invention. This may include spell checkers, spreadsheets, or any other similar application maintaining sorted data.

Figure 1:
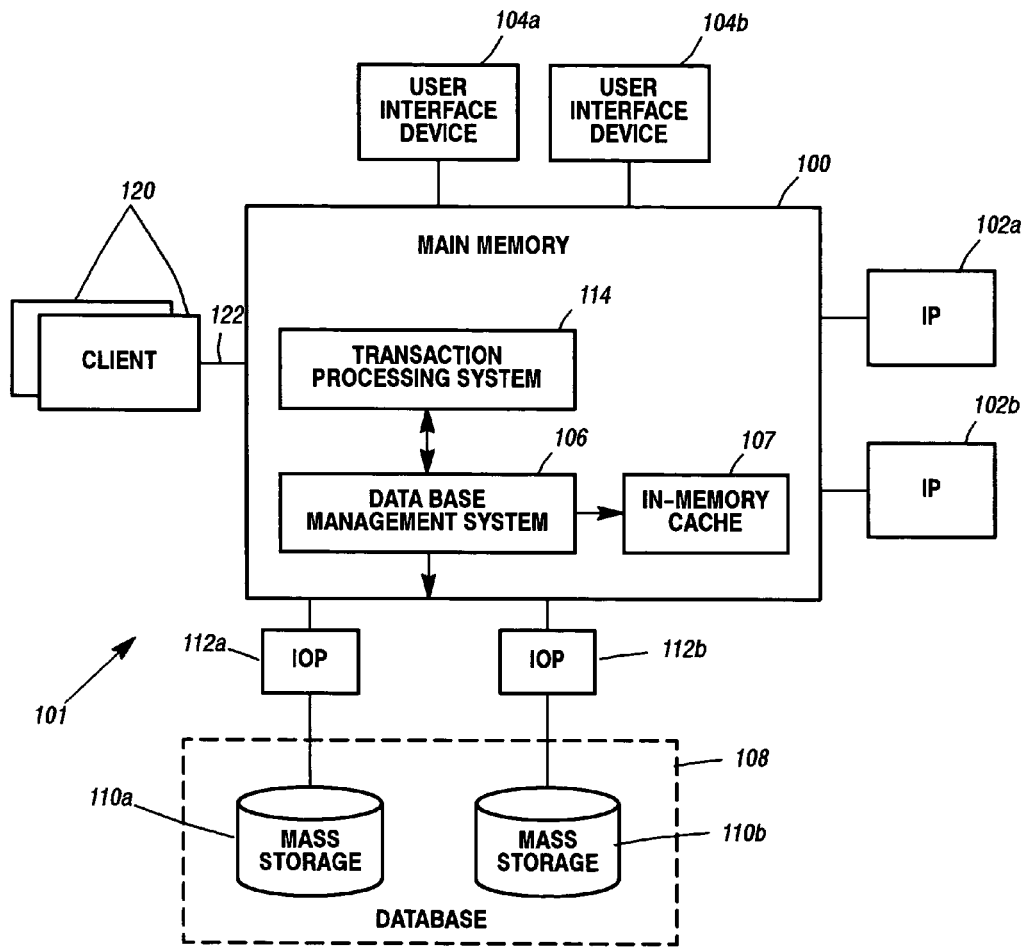
FIG. 1 is a block diagram of an exemplary data processing system that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DataBase Management System (DBMS) 106 is loaded into main memory 100. This DBMS, which may be any DBMS known in the art, manages, and provides access to, a database 108 (shown dashed). The database may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back up may be provided, if desired. The transfer of data between mass storage devices and DBMS is performed by Input/Output Processors (IOPs) 112a and 112b.

A transaction processing system 114 may be coupled to DBMS 106. This transaction processing system receives queries for data stored within database 108 from one or more users. Transaction processing system formats these queries, and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

It will be appreciated that the system of FIG. 1 is merely exemplary, and many other types of configurations may usefully employ the current invention to be described in reference to the remaining drawings.

FIGS. 2A through 2D are exemplary B+-trees illustrating the manner in which records are typically added to a B+-tree according to the prior art. The illustrated tree structure may be referred to as a "B+-tree" because only the leaf nodes contain data records. In contrast, a B-tree stores data records in both the non-leaf and the leaf nodes. This will be discussed further below.

FIG. 2A is a diagram of an exemplary B+-tree as may be used to represent a database table. This tree includes a non-leaf node 200 and two leaf nodes 202 and 204, which are children of non-leaf node 200. The non-leaf nodes store index values and pointers identifying the children. For example, non-leaf node 200 stores a pointer 206 and two index values "1,00" that identify leaf node 202. Similarly, the non-leaf node stores a pointer 208 and index values "17,00" identifying leaf node 204. Pointers 206 and 208 may each be an address, an offset, or any other type of indicia that uniquely identifies, and allows for efficient traversal to, a selected one of the leaf nodes. The index values identify which records are stored by the leaf nodes. For example, index "1,00" indicates that any records having index values greater than, or including, "1,00", but less than "17,00" will be located on leaf node 202. Any records having index values greater than or including "17,00" will be stored on leaf node 204. In another embodiment, non-leaf node 200 could store the index values for the last, rather than the first, record within the respective leaf node. For example, by storing index values "10,02" for leaf node 202, non-leaf node 200 records that all records having index values equal to, or less than, "10,02" are stored on leaf node 202.

Whereas the non-leaf nodes of a B+-tree store index values and pointers, the leaf nodes may store the actual record data. For example, leaf node 202 stores records having the index values of "1,00" through "10,02". Similarly, leaf node 204 stores records having index values of "17,00" through "20, 00". The index values provide searchable fields that are used to access a desired record. The one or more index values are used to arrange the records within a sort order. In some B+-trees, the leaf nodes need not store the entire record. Instead the leaf nodes may store pointers to one or more fields of the records, or the entire records themselves, which are stored elsewhere. For example, the records may be stored on storage space known as the heap. This is useful for record fields that store large amounts of data, such as Binary Large Object (BLOB) fields.

Leaf node 202 may store a pointer 210 to leaf node 204. This pointer may be an address or some other indicia that allows a search to be conducted at the leaf node level without traversing the hierarchy of the tree. In another embodiment, the pointers at the leaf node level may be omitted. In still another embodiment, these pointers are two-way pointers to allow traversal in either direction.

In one embodiment, when non-leaf and leaf nodes are created, they are each allocated a predetermined amount of storage space by the database management system. This predetermined amount of storage is referred to as a "page". The size of the page is determined by the database administrator. Within a tree, each leaf node is allocated the same amount of storage space as every other leaf node in the tree. Similarly, each non-leaf node is allocated the same amount of storage space as each other non-leaf node in the tree. Leaf nodes may, but need not, be the same size as non-leaf nodes. When updates are made to a record on a page, the entire page must be read and then updated. In the following discussions, the terms "leaf nodes" and "non-leaf nodes" are used synonymously with "leaf pages" and "non-leaf pages", respectively.

Next, the addition of records to the B+-tree of FIG. 2A is considered in reference to FIG. 2B.

FIG. 2B is a diagram of a B+-tree illustrating the addition of a record 211 having index values "9,01" (hereinafter, "record 9,01"). When inserting this record, the tree of FIG. 2A will be searched, starting with the root of the tree, which in the current example is non-leaf page 200. Using the index value "1,00" and pointer 206, the tree will be traversed to leaf page 202, which is the page to which the record will be added assuming sufficient storage space exists to complete this operation.

If record "9,01" 211 is sized to fit within the storage space remaining within leaf page 202, record "10,02" will be physically or logically shifted. Then record "9,01" 211 will be inserted between records "9,00" and "10,02" to preserve the sorting order of the records. However, in this example, page 202 does not have any storage space available to complete this insertion operation. Therefore, page 202 must be divided.

To divide leaf page 202, a new leaf page 212 is created. Page 202 is then split roughly in half, with approximately half of the records remaining on page 202, and the other half being copied to new page 212. In the current example, the first two records remain stored on page 202, and the other two records "9,00" and "10,02" are copied to new page 212. Then the new record "9,01" 211 is inserted between records "9,00" and "10,02" within page 212. If the insertion point had been located on page 202, the new record would have instead been stored on page 202 at the insertion point. Pointers 214 and 216 may be created to link the leaf pages in the manner described above. Additionally, a pointer 218 and an entry containing index values identifying page 212 are stored within root page 200.

The prior art method illustrated in FIG. 2B results in adequate storage allocation for storing new records so long as those records are received in a random, unsorted, manner. However, when a stream of multiple sorted records must be inserted within the data structure, the prior art method causes the records to be stored in an inefficient manner within the data structure. This can be appreciated by considering FIGS. 2C and 2D, discussed below.

FIG. 2C is a diagram illustrating addition of a sequence of records into the B+-tree of FIG. 2B according to a prior art method. The sequence includes records "9,02" and "9,03" which are sorted in ascending order according to the two index fields included within these records. The insertion point for these records is located within leaf page 212 after record "9,01". First, record "9,02" is inserted on page 212 filling that page. Since not enough room exists within this page to perform the insertion of record "9,03", leaf page 212 is divided at approximately the halfway point, with approximately half of the records being copied to new page 220. Then record "9,03" may be inserted within page 220. A pointer 222 and appropriate index values are stored in page 200 to identify page 220.

As shown by FIG. 2C, the foregoing process results in leaf page 212 being only half full, which is not efficient use of the storage space. The problem is accentuated if the sequence includes more records, as is shown in FIG. 2D.

FIG. 2D is a diagram illustrating the manner in which an extension of the sequence of records of FIG. 2C may be inserted into the B+-tree according to the prior art method. The extension of the sequence includes records "9,04" and "9,05". The insertion point for these records is located on record 220. First, record "9,04" is inserted on page 220 filling that page. Then, this page is split roughly in half, with records "9,04", and "10,02" being copied to new page 224. Record "9,05" is then inserted on new page 224. Page 224 is identified in root page 200 by a pointer 226 and an entry storing the index values of the first record "9,04" in the page.

As can be appreciated from FIG. 2D, both pages 212 and 220 are only half full after the insertion of the sequence of records "9,02" through "9,05". The problem increases as the sequence lengthens, and more leaf pages remain roughly 50% empty. In other words, the "load factor", which is a metric that measures overall usage of storage space within the leaf pages, trends towards 50% as the length of the sequence of records increases.

U.S. Pat. No. 5,644,763 to Roy provides an alternative approach to the above-described prior art mechanism. According to this alternative, in some instances wherein a sequence of records are received in an ascending order, a leaf page that includes the insertion point will be divided at that insertion point instead of the halfway point. This allows the newly created pages to be filled such that the load factor increases above 50%. The alternative prior art mechanism may be best understood by again considering the scenario set forth above. A sequence of records having index values "9,01"-"9,05" is to be added to the tree shown in FIG. 2A. The manner in which this is accomplished using the alternative prior art approach is described in reference to FIGS. 3A through 3C.

Figure 3A:
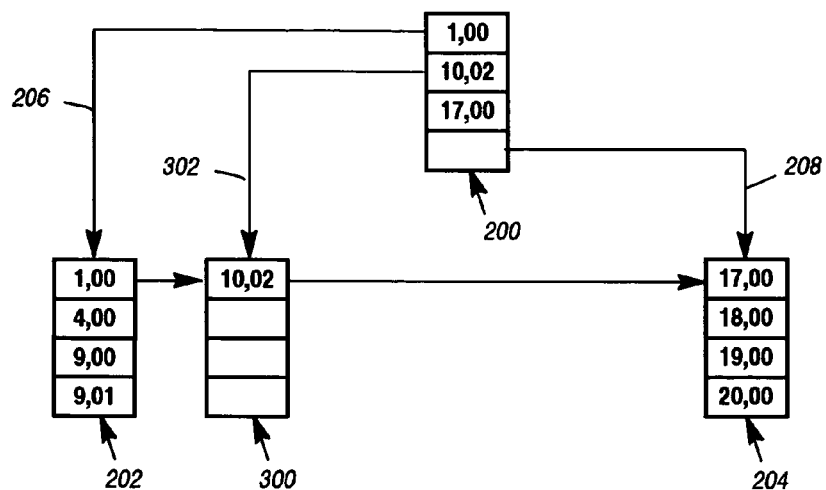
FIGS. 3A through 3C are tree diagrams illustrating insertion of an ascending sequence of records into a tree according to an alternative prior art approach.

In FIG. 3A, the first record "9,01" is inserted according to the alternative prior art mechanism as follows. The insertion point is located between records "9,00" and "10,02" within leaf page 202 of FIG. 2A. Leaf page 202 is split at this insertion point. To do this, a new leaf page 300 is created, and records after the insertion point are copied to this new page. In this example, record "10,02" is the only record that must be copied to the new page. An entry is created for the new page in root page 200. This entry stores a pointer 302 and the appropriate index values. Record "9,01" is then added to leaf page 202. This causes leaf page 202 to become full.

Figure 3B:
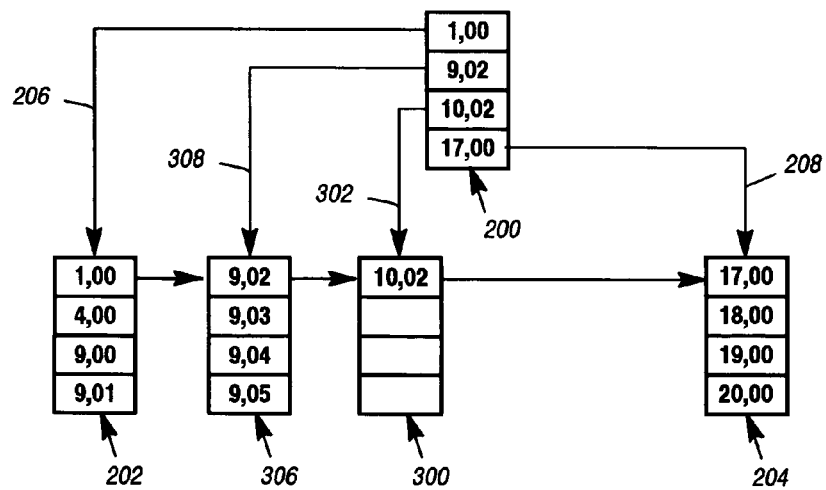

FIG. 3B illustrates insertion of records "9,02" through "9,05" into the tree of FIG. 3A. The insertion point is located at the bottom of leaf page 202. Leaf page 202 is therefore divided at this insertion point, creating leaf page 306. No records appear after the insertion point, and therefore no records are copied to new page 306. The remaining records "9,02" through "9,05" in the sequence may be inserted on this page, which is linked to root page 200 via pointer 308 and index values "9,02".

Figure 3C:
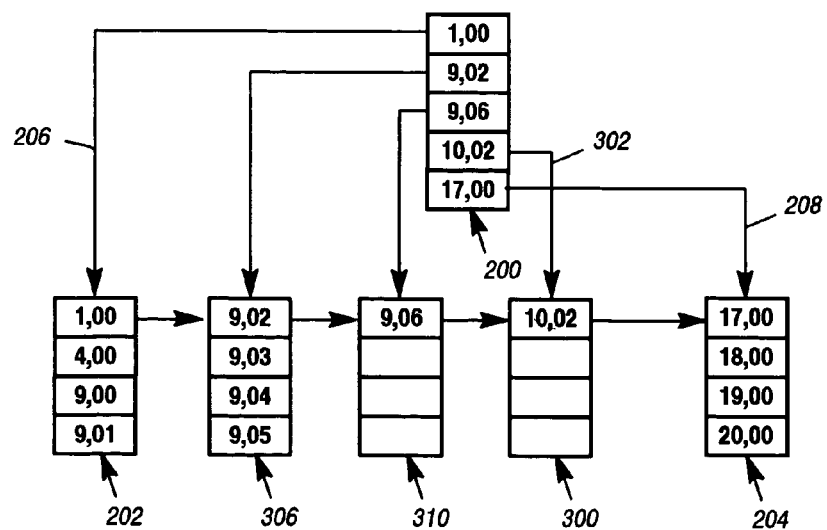

The process of FIG. 3B may be continued if the sequence includes additional records, as shown in FIG. 3C. For example, if the sequence includes an additional record "9,06", another leaf page 310 may be created at the insertion point, and the additional record is stored within this leaf page. The leaf pages may be linked to one another at the leaf page level to facilitate searching if desired.

As can be appreciated, in some situations wherein the sequence of records is sorted in ascending order, the alternative prior art method increases the load factor. All leaf pages storing the sequence of records, with the possible exception of the last leaf page, are filled. The last leaf page will also be filled if the sequence is continues.

Although the alternative prior art method illustrated in FIGS. 3A through 3C increases the load factor in some instances involving a sequence of records sorted in ascending order, the load factor is actually decreased when a sequence of records sorted in descending order is received. This is best appreciated in reference to the following FIGS. 4A through 4C.

Figure 4A:
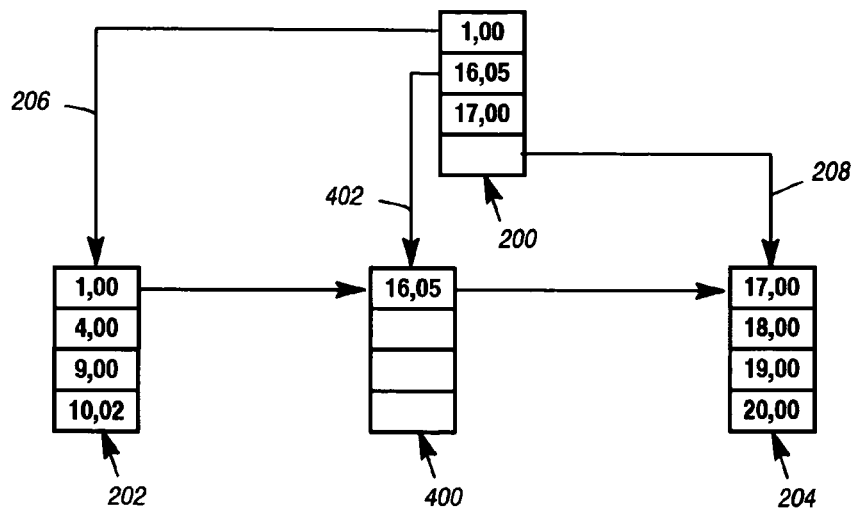
FIGS. 4A through 4C are tree diagrams illustrating insertion of a descending sequence of records into a tree according to the alternative prior art approach.

FIG. 4A is a diagram illustrating a first step in inserting a descending sequence of records into the B+-tree of FIG. 2A according to the alternative prior art mechanism. The sequence includes three records having index values of "16, 05", "16,04", and "16,03" that are received in descending sort order. When the first record "16,05" is received, the index values within root page 200 indicate this record should be stored within leaf page 202 if sufficient space is available. However, because sufficient space is not available, leaf page 202 is split at the insertion point to create a new leaf page 400 to store record "16,05", and the new leaf page is linked to root page via pointer 402.

Next, assume the following record in the sequence is received. This record includes index values "16,04". This record is processed in a similar manner. Specifically, root page 200 indicates that the record will be stored within leaf page 202 if sufficient storage space exists. However, because storage space is not available, another leaf page is created at the insertion point. This process will be repeated as each record in the descending sequence is received.

Figure 4B:
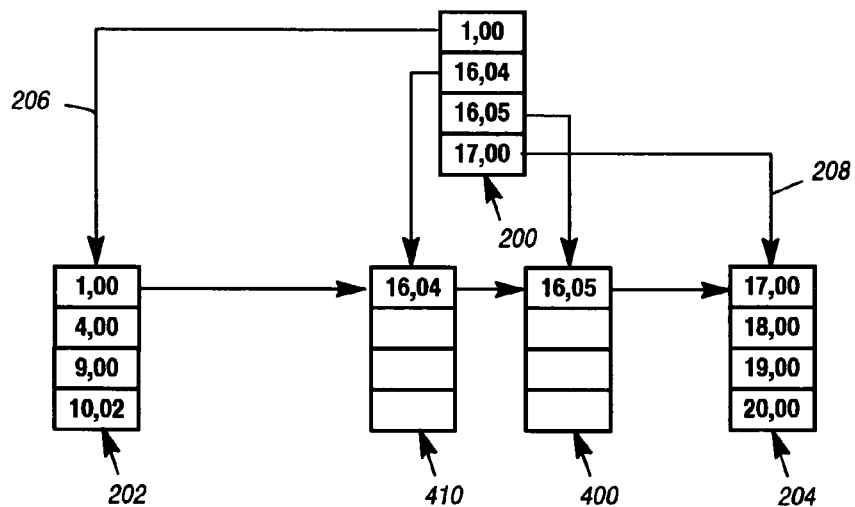
Figure 4C:
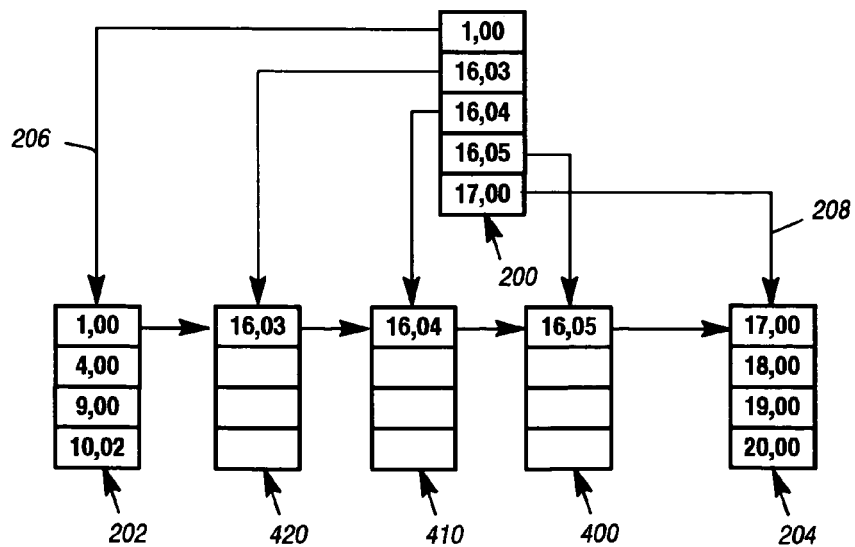

FIGS. 4B and 4C are diagrams illustrating the insertion of records "16,04" and "16,03" into the B+-tree of FIG. 4A. In FIG. 4B, a leaf page 410 is created to receive the record having an index value of "16,04", which follows record "16, 05" in the descending sequence. Similarly, in FIG. 4C, leaf page 420 is created to receive the record having an index value of "16,03". As each record in the descending sequence is added to the tree, another page is created, each storing only a single record. This results in a load factor that trends towards zero. This load factor can only be increased by combining some of the pages after insertion of the descending sequence has completed. This type of operation is time-consuming. Moreover, the affected pages of the database cannot be accessed while the combining operation is underway.

Figure 5A:
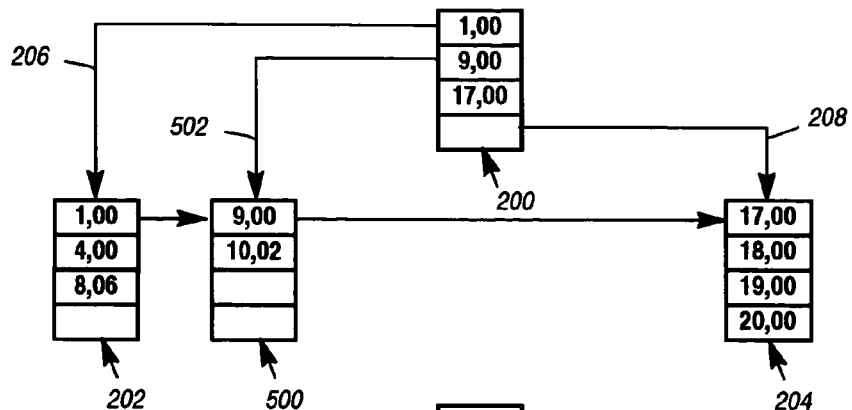
FIGS. 5A through 5D are tree diagrams illustrating another example of insertion of a descending sequence of records into a tree according to the alternative prior art approach.
Figure 5B:
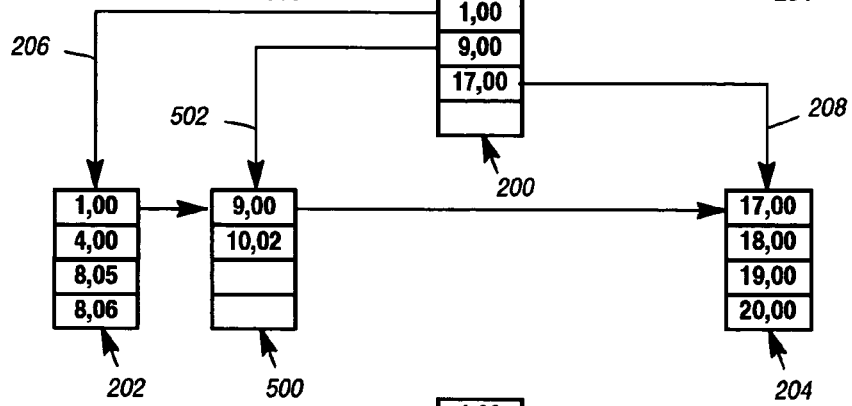
Figure 5C:
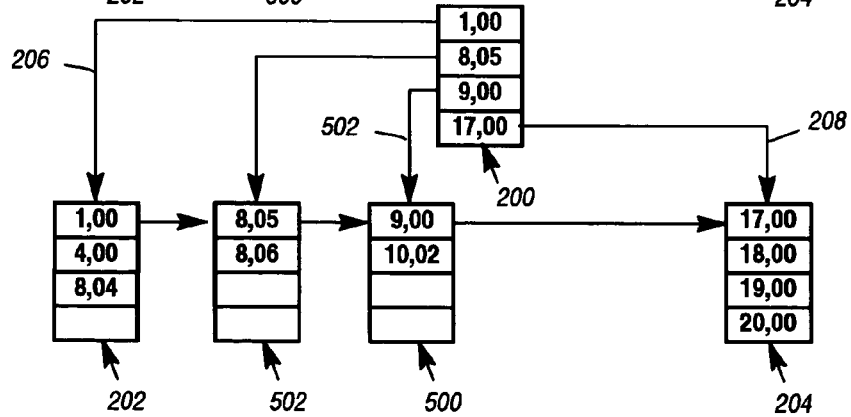

Another example of inserting a descending sequence of records into the tree of FIG. 2A using the alternative prior art mechanism is illustrated by FIGS. 5A through 5C. In FIG. 5A, a first record "8,06" is received. The index values within root page 200 indicate this record should be stored within leaf page 202 if sufficient space is available. However, because sufficient space is not available, leaf page 202 is split at the insertion point to create a new leaf page 500. The last two records of leaf page 202 are copied to leaf page 500, and this leaf page is linked to root page via pointer 502. Then the new record may be stored within leaf page 202.

Next, record "8,05" is received. This record is stored within leaf page 202 at the insertion point. Thereafter, when record "8,04" is received, not enough storage space is available to make the insertion into leaf page 202. Therefore, leaf page 502 is created. Records "8,05" and "8,06" are copied to this new leaf page 502 so that record "8,04" may be stored to leaf page 202.

Figure 5D:
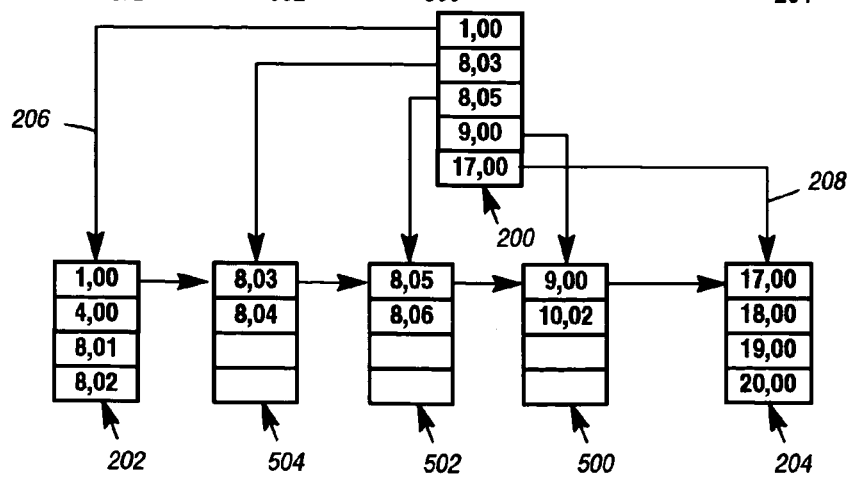

FIG. 5D is a diagram illustrating insertion of additional records "8,03" through "8,01" into the tree of FIG. 5C. Following insertion of the record "8,03", leaf page 202 is full. When the next record in the sequence is received, leaf page 202 is split at the insertion point so that new page 504 is created to store records "8,03" and "8,04". Additional records "8,01" and "8,02" are stored within leaf page 202. The process will continue for as many records are included within the sequence. In this example, the load factor of the tree trends downward as the number of pages added to the tree increases.

As may be appreciated by the foregoing discussion, the alternative prior art method of inserting a sequence of records does not provide adequate performance when a sequence of records is received in a decreasing sort order. Moreover, it may be noted that if the tree structure of FIG. 2A is modified so that non-leaf pages store index values from the last, rather than the first, records within the leaf pages, a similar problem exists in regards to an ascending sequence of records. For example, assume that non-leaf page 200 of FIG. 2A stores the values "10,02" rather than "1,00" for leaf page 202. Receipt of a sequence of records "10,03" through "10,05" in ascending sort order will result in creation of three additional leaf pages, each storing one of the newly received records. This results in wasted storage space. Moreover, because more leaf and non-leaf pages are added to the tree during this process, a subsequent search of the tree will require more time to complete as additional pages, and in some cases, hierarchical levels, are traversed.

The current invention provides a more flexible approach to storing a sequence of records. According to the inventive method, a sequence of records sorted in either ascending or descending sort order may be stored within a B$^+$-tree or a B-tree in a manner that does not reduce the load factor of the tree. According to one embodiment of the invention, a page including the insertion point for the one or more records in the sequence is located. If this page has sufficient storage space available for the records, the records are inserted into the page, and the process is complete. If sufficient storage space is not available to store all records included within the sequence, one of three actions is taken based on the amount of storage space remaining on the page that includes the insertion point.

According to a first scenario, if the page can be split so that the records in the sequence can be retained on the same page as a record adjacent to the insertion point and also adjacent to the last record in the sequence ("adjacent record"), the page split occurs in this manner. By splitting the page so that the adjacent record is retained on the same page as the records in the sequence, the undesirable situations depicted in FIGS. 4A-4C and 5A-5D can be avoided if additional records in the sequence are received later. This will be discussed further below in reference to the remaining drawings.

According to a second scenario, if a page split can be accomplished so that all records in the sequence fill a page without allowing for room for the adjacent record, the page is split at the insertion point. The adjacent record is stored on a different page as compared to the records in the sequence. Finally, according to a third scenario, the records in the sequence are too large to be retained on a single page after a page split occurs at the insertion point. In this case, a page split occurs at the insertion point, with as many records in the sequence as possible filling one of the resulting pages. Additional records in the sequence are stored to the other page, along with the adjacent record. If necessary, more than two pages may result from this type of page split to provide sufficient space to accommodate the entire sequence. If storage space permits, the adjacent record will be stored on whichever page stores the last record of the sequence.

According to the foregoing embodiment of the invention, DBMS 106 detects that a descending or ascending sequence of records is to be inserted into the tree before the insertion begins. This detection may be performed because of manual intervention. For example, in one implementation of this embodiment, a database administrator provides information to the DBMS indicating the number of records in the sequence, the type of the sequence (ascending versus descending), as well as the total size of the storage space required to store all records. In another scenario, automated pre-processing of the records that are being inserted occurs so that the system detects that a number of N records in a sequence is about to be inserted into the database table. The system further determines the approximate total size of the storage space required to store the records. In either case, DBMS 106 obtains an indication that receipt of a sequence of records is going to occur. This indication is received before the first record in the sequence is obtained for insertion into the tree. The detailed operation of this embodiment may be best understood from the following examples.

FIGS. 6A through 6D are tree diagrams that illustrate the insertion of an ascending sequence of records into a tree according to one embodiment of the current invention. In this example, the tree is similar to that shown in FIG. 2A. However, the tree of FIGS. 6A through 6D differs slightly from that shown in FIG. 2A in that non-leaf page 600 stores the index values from the last, rather than the first, records on pages 602 and 604. However, as will be discussed below, the inventive system and method may be adapted for use regardless of whether index values from the first or last records are recorded within the non-leaf pages.

As discussed above, several scenarios may occur during an insertion of a sequence of records. In the most straightforward scenario, the sequence of records may be stored within existing storage space of a page without splitting that page. The insertion can be completed by merely locating the insertion point, and storing the records at that point.

A second scenario is depicted in FIG. 6B. In this case, three sequential records 606 are received having index values in the range "1,01 through 1,03". The insertion point for the records is located between the records having index values "1,00" and "4,00". As discussed above, according to the current embodiment of the invention, the system has determined ahead of time the amount of storage space needed for the sequence of records 606. Therefore, after the insertion point is located, the system is able to determine whether the sequence 606 can be maintained on the same page as the record adjacent to the insertion point, and adjacent to the last record in the sequence (the "adjacent record"). In this case, record 608 is the "adjacent record". In the example of FIG. 6B, both the sequence 606 and adjacent record 608 may be stored on page 602. Therefore, page 602 is split so that the adjacent record remains on the same page as the sequence 606, and all records on the other side of the adjacent record are copied to a new page 610.

Keeping the adjacent record on the same page as the sequence provides important advantages. Many times, a sequence of records will be continued in the future. That is, a first group of records within the sequence will be received, followed by a second group of records that continues the sequence. This may occur, for example, when an index field is recording time values. By keeping the adjacent record on the same page as the original group of records in sequence, it is possible to store the second group of records on that same page at a later time, assuming adequate storage space is available. If the adjacent record were instead copied to another page, as would be the case when using the prior art method illustrated in FIGS. 4A through 4C, another page must be created to store the second group of records.

Yet a third scenario is illustrated in FIG. 6C. In this case, a sequence of records 612 is received. Sufficient storage space is not available on page 602 to store both this sequence and adjacent record 608. Therefore, page 602 is split at the insertion point so that the sequence is stored on one page, and the adjacent record and all records on the other side of the adjacent record are stored on the other page 610. Because this operation will, in most cases, use most, if not all, of the storage space available on page 602, it does not matter that a subsequently received continuing sequence of records cannot be stored on page 602 with the original sequence of records.

Still another scenario is illustrated in FIG. 6D. In this case, it is determined that the sequence of records, including those having index values "1,01 through 1,05", will not entirely fit on the page that includes the insertion point. Therefore, the original page 602 receives as many records in the sequence as possible. The remaining records are copied to a new page 610, followed by the adjacent records, and records following the adjacent record. If more than one additional page was required to store all records, those pages would be created to accommodate the entire sequence. If storage space permits, the adjacent record is stored on the same page with the last received record in the sequence.

Figure 7A:
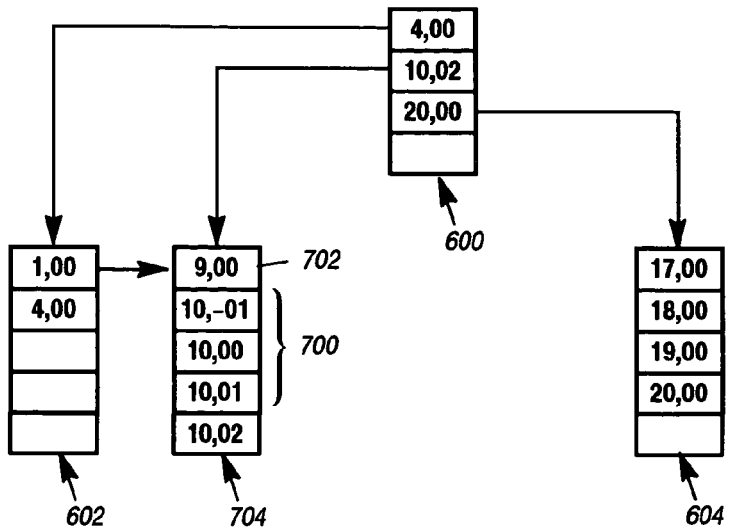
FIGS. 7A through 7C are tree diagrams illustrating insertion of a descending sequence of records into a tree according to the current embodiment.
Figure 7B:
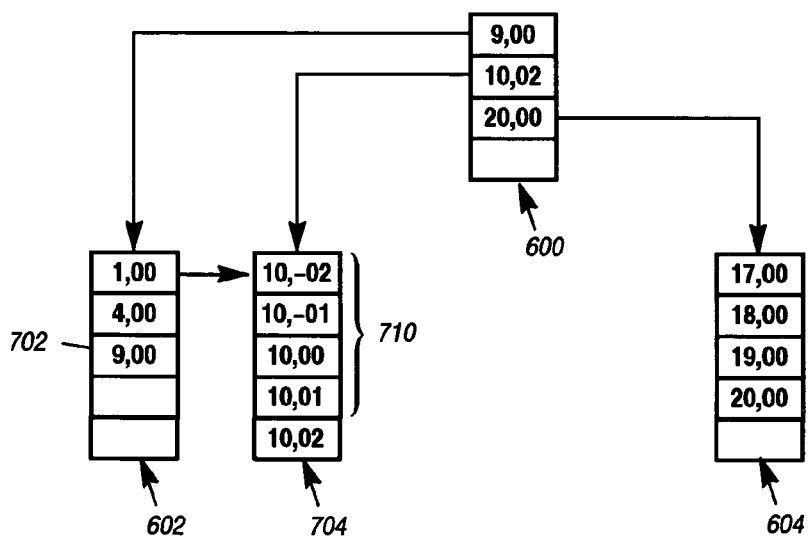
Figure 7C:
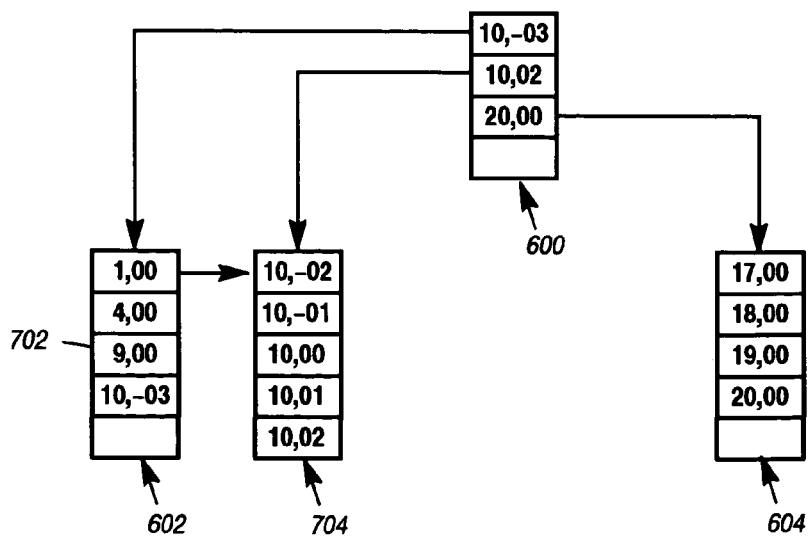

FIGS. 7A through 7C are tree diagrams illustrating insertion of a descending sequence of records into a tree according to one embodiment of the current invention. As was the case in FIGS. 6A through 6D, the scenario of FIGS. 7A through 7C assumes that the system has detected that a sequence is being received, and has determined the total storage space needed to accommodate the record sequence. These determinations are made before the first record in the sequence is processed.

It will be assumed that a descending sequence of records is being inserted into a tree as shown in FIG. 6A having a non-leaf page 600 and two leaf pages 602 and 604. In a first scenario shown in FIG. 7A, a sequence 700 including records having index values in the range of "10,01" through "10,−01" is received. The insertion point for this sequence of records is located on page 602 (as shown in FIG. 6A) between the records having index values "9,00" and "10,02". The system determines that record 702, which has an index value of "9,00", is the adjacent record. This determination is made because that record is adjacent to the last record "10,−01" in the descending sequence. The system further determines that page 602 does not include enough storage space to store both sequence 700 and adjacent record 702. However, if page 602 were split, the new page would include enough space to store both the adjacent record and the sequence of records. Therefore, the page is split such that the adjacent record 702, sequence 700, and the records following the sequence (in this case, just record "10,02") are copied to new page 704. Page 602 retains the records on the other side of the adjacent record.

FIG. 7B illustrates another scenario wherein after a page split at the insertion point, the sequence of records will fit onto one of the resulting pages without leaving room for the adjacent record 702. In this case, the sequence 710 is stored on page 704, and the adjacent record and all records on the other side of the adjacent record, are stored on the other page 602.

FIG. 7C illustrates the remaining scenario in which the sequence of records will not entirely fit on a page after a page split occurs. In this case, page 602 is split so that a new page 704 is created that includes all of the records following the sequence, and as many records in the sequence as possible. The remaining records in the sequence are retained on page 602 along with adjacent record 702. If additional pages were required to store the sequence, as many pages as needed would be created.

In the example of FIGS. 7A through 7C, the index values included within each of the records of the sequence are part of what may be referred to as a "composite key". This composite key has two fields, or "segments", the range segment and the varying segment. The range segment includes those indices, or "key columns", that store values that do not vary between the records in the sequence. For instance, in the example of FIGS. 7A through 7C, the range segment includes the key column containing the value of "10" for each record in the sequence. In contrast, the varying segment includes those one or more indices, or key columns, storing values that do vary between the records in the sequence. For instance, in the example of FIGS. 7A through 7C, the varying segment includes the key column having a value that varies between "02" and "−03" for the records in the sequence. Use of the composite key is discussed further below.

Figures 8, 8A:
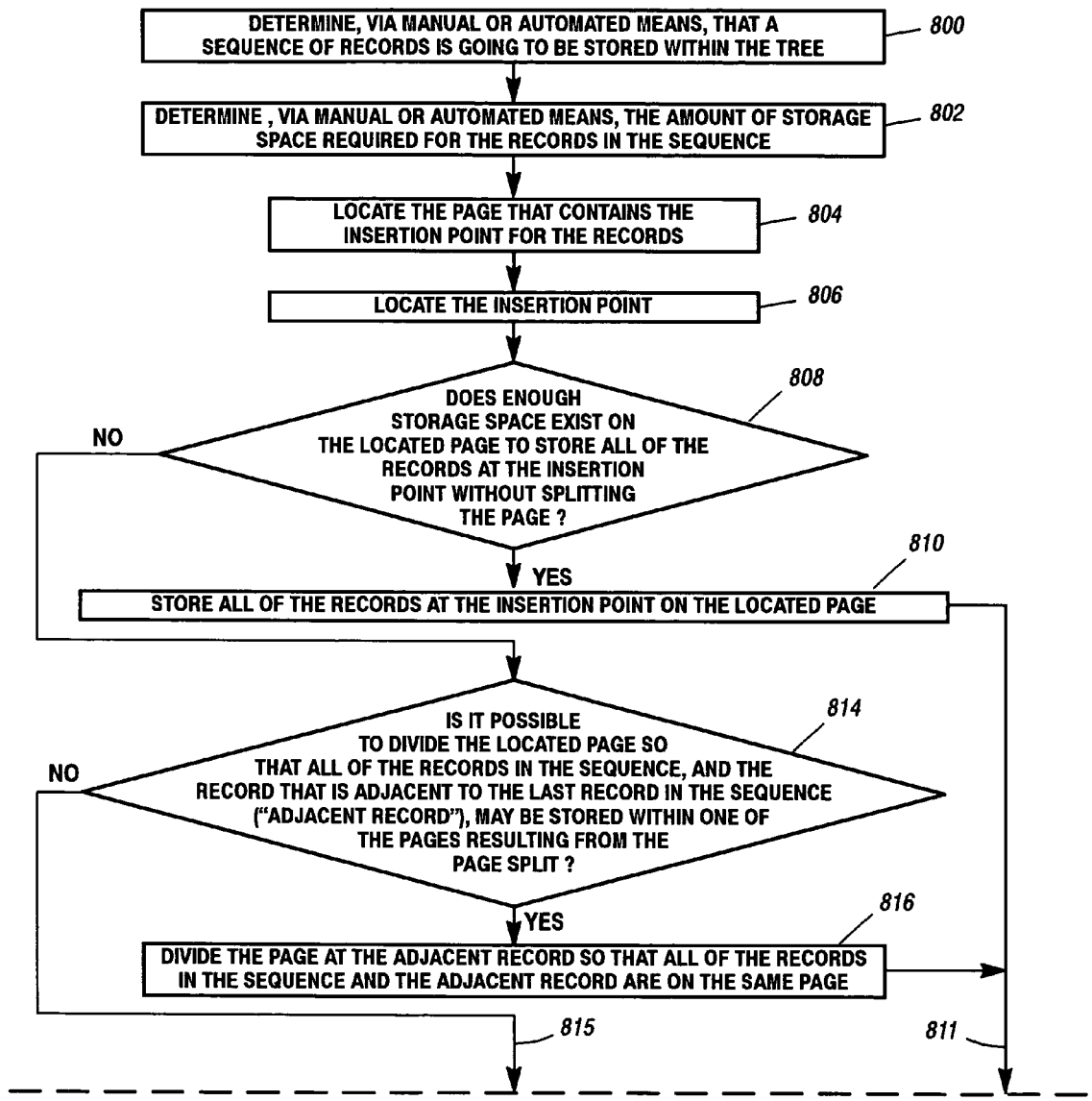
FIGS. 8A and 8B, when arranged as shown in FIG. 8, are a flow diagram illustrating a first embodiment of the invention.
Figure 8B:
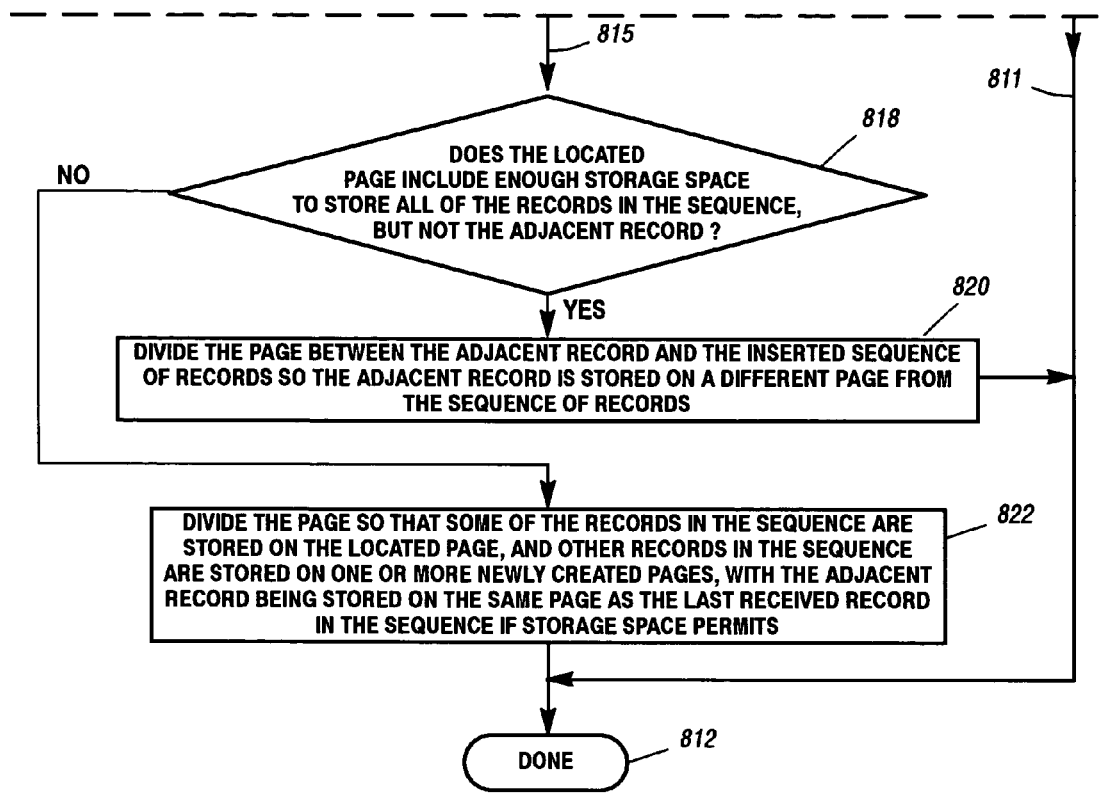

FIGS. 8A and 8B, when arranged as shown in FIG. 8, are a flow diagram illustrating a first embodiment of the invention described above in reference to FIGS. 6A-6D and 7A-7C. In step 800 of FIG. 8A, it is first determined that a sequence of records will be received. The sequence may be an ascending sequence or a descending sequence. The detection of a sequence may occur via manual means. For example, a database administrator may provide an indication that a sequence is about to be loaded. In another embodiment, a pre-processing application scans records that are to be loaded into the database, detecting sequences of records by comparing the values stored within the key columns of the varying segment.

In step 802, the approximate storage space needed to store all records in the sequence is determined. As was the case in step 800, this step may be accomplished using manual means. For example, a database administrator may provide information regarding the loading of a sequence of records into the database table. In another embodiment, a pre-processing application scans records that are to be loaded into the database to determine the approximate storage space required for those records.

After the detection of a sequence has been accomplished, the page containing the insertion point for the sequence is located (804). The insertion point within this page is then located (806). If enough space exists on the located page to store all of the records in the sequence without splitting the page (808), the records are stored on this page (810). Processing is then considered complete, as indicated by arrow 811, which continues to block 812 of FIG. 8B.

Returning to step 808 of FIG. 8A, the located page may not have enough storage space available to store all of the records in the sequence. In that case, it is next determined whether the located page could be divided so that the sequence of records, and the record that is adjacent to the last-received record in the sequence and the insertion point ("adjacent record") could be stored on a same one of the pages resulting from the page split (814). If so, the page is divided so that the sequence and the adjacent record are stored on the same page, and all records to the other side of the adjacent record are stored on the other page resulting from the page split (816). As illustrated in FIG. 6B, this may entail retaining the adjacent record and sequence on the originally located page while copying records on the other side of the adjacent record to a newly created page. Alternatively, this may involve copying the adjacent record and the sequence to a newly created page, as shown in FIG. 7A. The handling of this step will depend on whether an ascending or descending sequence is being processed, as discussed above. Following step 816, processing is completed, as indicated by arrow 811.

If, in step 814, it is determined that following a page split, the sequence and adjacent record cannot be accommodated on the same page, processing continues to FIG. 8B, as indicated by arrow 815. In step 818 of FIG. 8B, it is determined whether, after the page split, all records in the sequence can be stored on the same page. If so, the located page is divided at the insertion point so that all records in the sequence are stored on one of the resulting pages (820). This may involve storing the sequence on the originally located page, as shown in FIG. 6C, as will occur for an ascending sequence. Alternatively, this may involve copying the sequence to a page created during the page split. This is shown in FIG. 7B for a descending sequence. In either case, the adjacent record, and all records to the other side of the adjacent record, will be stored on a different page from that storing the sequence.

If, in step 818, it is determined that after the page split, all records in the sequence cannot be stored on the same page, the located page is split at the insertion point. Some of the records are copied to a newly created page, and others are retained on the originally located page (822).

The foregoing embodiment of the invention eliminates situations such as those depicted in FIGS. 4A through 4C, and 5A through 5D. This is accomplished by storing records in a manner that increases the load factor of the leaf pages. In addition, whenever possible, leaf pages are split so that a sequence of records is stored on a same page as a non-sequence record adjacent to the sequence. As a result, when a second sequence of records is received that is a continuation of the first sequence, as is often the case in database administration, that continuing sequence can be stored on a same page as the end of the original sequence.

The embodiment of the invention discussed above is predicated on knowing that a sequence of records is being received, and further upon determining in advance, the total amount of storage space required to accommodate all records in the sequence. In some cases, this is not practical. In those cases, it may be beneficial to determine "on-the-fly" that receipt of a sequence may be occurring. In this case, records are processed one at a time, and the total amount of space required for the sequence is not known ahead of time. In this embodiment, the load factor may be optimally increased by adhering to several guidelines that are similar to those discussed above with respect to the first embodiment of the invention.

To understand the first of these guidelines, consider a scenario such as shown in FIG. 4C. In this example, the non-leaf pages of the tree store index values for the first records on each of the leaf pages. Further assume a descending sequence of records is being received, one record at a time, as shown in FIGS. 4A through 4C. In the example, the insertion point for these records occurs at the bottom of page 202. Splitting of the page at this point results in record "16,05" being copied to new page 400, as illustrated in FIG. 4A. Assuming that a next record "16,04" in the sequence will be received, this next record cannot be stored on the same page as record "16,05". This is because non-leaf page 200 links to leaf page 400 via the index values of the first record. As such, only records after record "16,05" can be stored on page 400. Therefore, as each record in the descending sequence is received, the insertion point is determined to be at the end of page 202, and another page is created, as shown in FIGS. 4B and 4C. This trends the load factor towards zero.

To address the foregoing situation, a first guideline is applied for use in the situation involving decreasing sequences added to the beginning of a page in trees that that link non-leaf pages to leaf pages via the index values for the first records on a leaf page. According to this guideline, the record stored at the edge of the page next to the insertion point must be stored on whichever page stores the record in the sequence. For example, in FIG. 4A, when page 400 is created, record "10,02" must be copied to page 400 to be stored along with record "16,05". This allows page 400 to store any additional records that may be received in the descending sequence. When page 400 is full and the sequence is continued, a new page may be created to receive record "10,02". Any additional records in the sequence may then be stored to this new page, and so on. In this manner, the load factor trends towards 100%.

A similar situation may be described in reference to FIG. 6A. In this case, the tree is constructed so that non-leaf pages are linked to leaf pages via index values for the last records on each of the leaf pages. This tree receives, one record at a time, an ascending sequence of records having index values "16,03", "16,04", and "16,05". The insertion point for the first record is located at the top of page 604. If a new page is created to store record "16,03", the subsequently received records cannot be stored on this new page, since this leaf page is linked to non-leaf page 600 via the index values for the last record on the page. Thus, as each record in the ascending sequence is received, the insertion point located at the top of page 604 causes creation of another page that stores only a single record. Again, the load factor trends towards zero.

If the first guideline is applied to the foregoing scenario, the record stored at the edge of the page at the point of insertion is stored on whichever page stores the record in the sequence. Thus, record "17,00" of page 604 is copied to a new page along with record "16,03" (not shown in FIG. 4A). This allows any subsequently received records in the ascending sequence to also be stored to this new page, such that the load factor will trend toward 100%.

To restate the first guideline, if the insertion point for a new record is located at an edge of an existing page such that the received record will be stored on a newly created page by itself, a determination must be made as to whether a subsequently received record in the sequence may also be stored on the same page. If not, the record stored at the edge of the page adjacent to the insertion point must be stored on whichever page stores the new record. This will be discussed further below in reference to additional examples.

The above guideline addresses situations wherein an insertion point is located at an edge of a page. A second guideline is needed to address situations wherein a record in a sequence is inserted at a location that is not at an edge of a page. This guideline can best be understood by considering the scenario illustrated in FIGS. 5B through 5D.

Assume that a tree is in the state shown in FIG. 5B when another record having index values "8,04" is received. This record is included within a descending sequence of records that also includes records "8,05" and "8,06" shown stored on page 202. Splitting page 202 at the insertion point to add this record results in the undesirable result shown in FIGS. 5C and 5D. To detect, ahead of time, that this type of unwanted situation is about to occur, it may be imagined that page 202 is split at the insertion point, and the new record "8,04" is added to whichever page stores other records in the sequence. According to this hypothetical situation, records "8,05" and "8,06" would be stored on a new page 502 as shown in FIG. 5C, and record "8,04" would also be stored at the top of this page. Next it is determined whether, in this hypothetical scenario, the index values of the new record "8,04" will be copied to the parent non-leaf page 200. In FIG. 5C, assuming the most recently added record "8,04" were stored on page 502, the index values from this record would indeed be copied to page 200. This would occur because non-leaf page 200 stores the index values for the first records on the leaf pages. Thus, in this hypothetical scenario, a situation is created wherein no additional records within the descending sequence may be stored on page 502, leading to the less than optimal results depicted in FIGS. 5C and 5D.

The analysis discussed is employed to determine whether division of a page at an insertion point will produce non-optimal results if a sequence of records is being processed. If so, a second guideline may be triggered as follows. The page will be divided at the record adjacent to the last record in the sequence ("adjacent record", as described above). In the current embodiment wherein records are received one-at-a-time, the adjacent record will be located at the insertion point next to the record of the sequence that was most recently stored to the tree.

Applying the second guideline to the example above wherein record "8,04" is being added to the tree of FIG. 5B, record "4,00" is the "adjacent record" because it is next to the insertion point and adjacent the sequence record "8,05" that was most recently added to the tree. Because the analysis discussed above indicates undesirable results will occur if a page split is performed at the insertion point, an attempt will be made to split page 202 at this adjacent record. This will cause record "8,04" to be stored on the same page with other records in the sequence, as well as the adjacent record "4,00". Thus, in FIG. 5C, record "1,00" will be stored on page 202, and records "4,00", and "8,04" through "8,06" will be stored on page 502. This will result in an optimal loading factor if additional records in the sequence are received, as will be discussed below.

It may be noted that in some cases, the type of page split operation discussed above will not be possible. That is, after the page split, there will not be a page having enough storage space to store the sequence of records along with the adjacent record. In this case, the adjacent record must be stored on a different page as compared to the sequence. This will become clear from additional examples discussed below.

The guidelines discussed above may be applied to situations involving descending or ascending sequences. They may also be applied to trees wherein the leaf and non-leaf pages are linked by index values from either the first, or last, records on the non-leaf pages. All of these situations are depicted in the following illustrations.

Figure 9E:
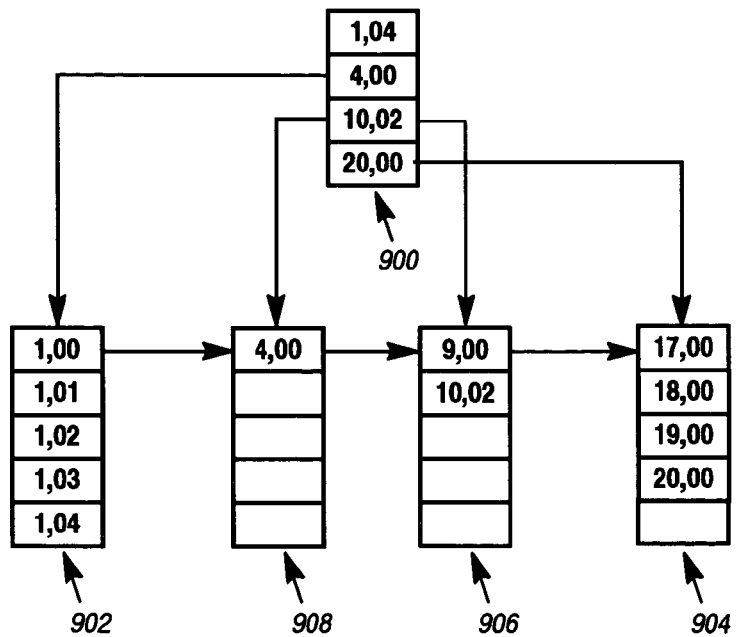

FIGS. 9A through 9F are tree diagrams illustrating the insertion of an ascending sequence of records into a tree according to the current embodiment of the invention. FIG. 9A illustrates the tree before insertion of the sequence. It may be appreciated that this tree links non-leaf page 900 to leaf pages 902 and 904 via the index values from the last records on the leaf pages.

In FIG. 9B, a first record "1,01" of a sequence is received. It will be assumed that because DBMS detects that the index values of this record are contiguous with those of a record already stored within the tree (specifically, record "1,00" stored on page 902), DBMS invokes processing for a sequence. Because this first record of the sequence may be stored within the tree of FIG. 9B without splitting any pages, no special processing is necessary, and the record is merely inserted on page 902.

Next, another record "1,02" is received. Sufficient storage space is not available to store this record on page 902 of FIG. 9B. Therefore, page 902 must be split. The insertion point is not at an edge of a page, and the second guideline for sequences discussed above is therefore considered. According to a hypothetical situation associated with the guideline, if page 902 is split at the insertion point between record "1,01" and "4,00", and record "1,02" is thereafter stored on page 902 along with other records within the sequence, the index values for record "1,02" will be copied to non-leaf page 900. This sets up the undesirable situation wherein no additional records in the ascending sequence may be stored to page 902 in the future. This test therefore triggers the second guideline in a manner shown in FIG. 9C.

In FIG. 9C, page 902 is split so that the record adjacent the end of the sequence, which is record "4,00", is stored on the same page as newly received record "1,02". All records on the other side of adjacent record "4,00" are copied to new page 906.

Next, record "1,03" is received, as shown in FIG. 4D. Since adequate storage space is available to store this record within page 902, no special processing is necessary. Now, when another record "1,04" is received for possible insertion into page 902, that page is already full. Because the insertion point is not at the edge of page 902, the second guideline must again be considered. The same analysis is performed as was discussed in reference to FIGS. 9B and 9C. According to this analysis, it is determined that the second guideline should be invoked, since storage of record "1,04" on page 902 would result in the copying of the index values for record "1,04" to non-leaf page 900.

According to the second guideline, an attempt will be made to store record "1,04" and the adjacent record "4,00" on the same page with other records in the sequence. However, in this case, this is not possible because not enough storage space is available on page 902 to store both the new and the adjacent records. Therefore, only the new record "1,04" is stored to page 902, and a new page 908 is created to store adjacent record "4,00".

Figure 9F:
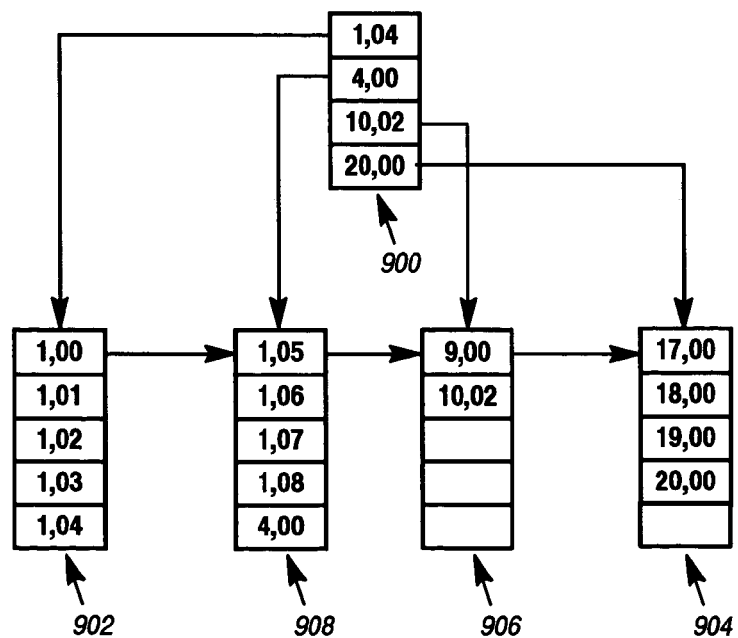

In FIG. 9F, additional records in the sequence are received. These records are added, one at a time, to page 908. When that page is full, the same process discussed above in reference to FIGS. 9D and 9E will be used to create still another page to store record "4,00", and the process is repeated.

It may be appreciated from FIGS. 9A through 9F that the current invention adds sequential records to pages of a tree so that the load factor trends towards 100%. This may be further appreciated by considering the remaining examples.

Figure 10A:
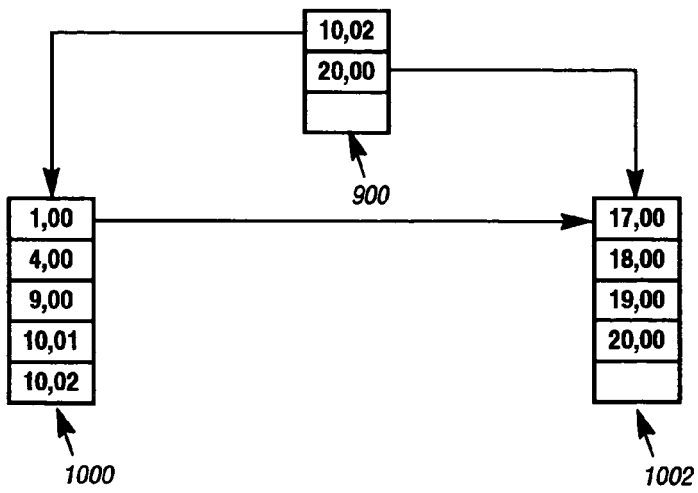
FIGS. 10A through 10C are tree diagrams illustrating the insertion of a descending sequence of records into a tree according to the alternative embodiment of the invention.
Figure 10B:
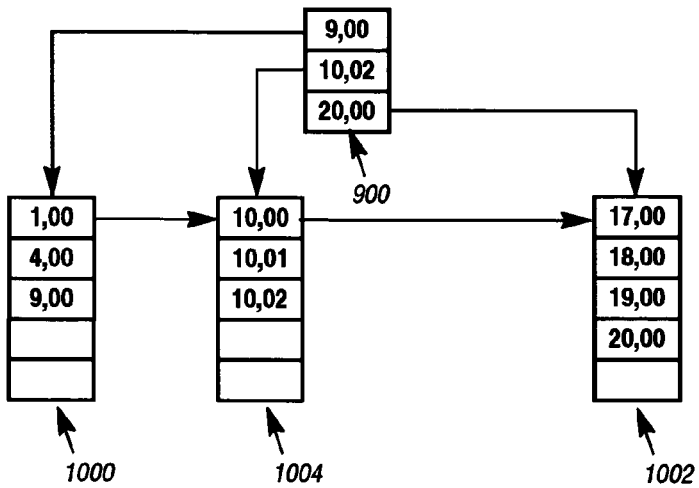
Figure 10C:
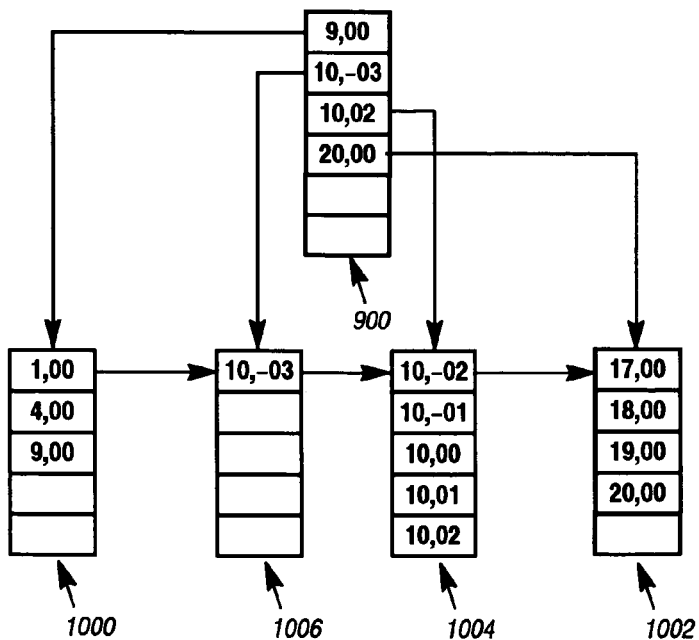

FIGS. 10A through 10C are tree diagrams illustrating the insertion of a descending sequence of records into the tree of FIG. 9A. In FIG. 10A, a first record "10,01" in the sequence is received. The system detects that this record is contiguous with another record "10,02". Storage space is available on page 1000, and the record is inserted at the insertion point without any special processing. Next, another record "10,00" is received. In this case, not enough space is available on page 1000, which must be split. The insertion point is not at the edge of page 1000, and the second guideline must therefore be considered. If the page were split at the insertion point, and the new record "10,00" were added on the page with other records in the sequence, the index values of "10,00" would not be copied to non-leaf page 900 in this case. This is because non-leaf page 900 stores index values from the last, rather than the first, record of the leaf pages. Therefore, the second guideline is not triggered, and there is no need to maintain adjacent record "9,00" on the same page as the new record "10,00". Page 1000 is split so that the adjacent record is retained on page 1000, and new record "10,00" and the following records on page 1000 are copied to new page 1004.

Next, additional records "10,-01" and "10,-02" are received, in turn. These records are added to page 1004 so that page becomes full, as shown in FIG. 10C. When a next record "10,-03" is received, the insertion point for the record is at the edge of page 1004, so the first guideline must be considered. Assume page 1004 is divided at the insertion point so that new record "10,-03" is stored on a new page alone. The index value "10,-03" for the record will be stored within non-leaf page 900. If a next record in the sequence is received having index values "10,-04", the record may be stored on the new page with record "10,–03", since non-leaf page 900 stores the index values from the last, rather than the first, record on the page. Thus, storing record "10,–03" on the new page will not result in an undesirable situation wherein record "10,–03" and subsequently received records in the descending sequence, are each stored alone on separate pages. Therefore, the first guideline need not be invoked. Page 1004 may be divided at the edge of the page, with record "10,–03" being stored on a new page 1006, as shown in FIG. 10C. Additional records in the sequence may be received and stored on page 1006 until the page is full. That page may then be divided in the manner described in reference to FIG. 10C.

The above-described examples relate to trees that link non-leaf pages to leaf pages using index values from the last records on the leaf pages. The current embodiment may also be employed in trees that link non-leaf pages to leaf pages using index values from the first records on the leaf pages, as will be discussed further below.

Before discussing the current embodiment in more detail, it will be recalled that according to this embodiment, detection of a sequence of records occurs as the records are being received, rather than before the records are received. Thus, a sequence will not be detected until DBMS receives a record having index values that are contiguous with the index values of another record already stored within the tree. Thus, upon receipt of a first record in a sequence, DBMS will not recognize that a sequence of records is being processed, and the guidelines discussed above will only be enforced after a second record in the sequence is received. The ramifications of this embodiment will be discussed further below.

In a variation of the above-described implementation, a database administrator may provide the system with an indication that a sequence of records is about to be received. This results in the guidelines discussed being invoked for all records in the sequence. This implementation does not require that the total size of all records in the sequence be specified, however, as was the case involving the first embodiment of the invention. The differences between these two implementations will be discussed further below.

Next, the details of the current embodiment may be considered further in the following additional examples.

FIGS. 11A through 11D are tree diagrams illustrating use of the current embodiment to insert a descending record sequence into a tree that links leaf and non-leaf pages via the index values of first records on the leaf pages. In this scenario, it will be assumed that an operator has placed the system in a descending sequence mode prior to receipt of the first record in the sequence, so that sequence processing occurs for each record. If this were not the case, handling of the sequence would be slightly different, as will be discussed further below.

Figure 11A:
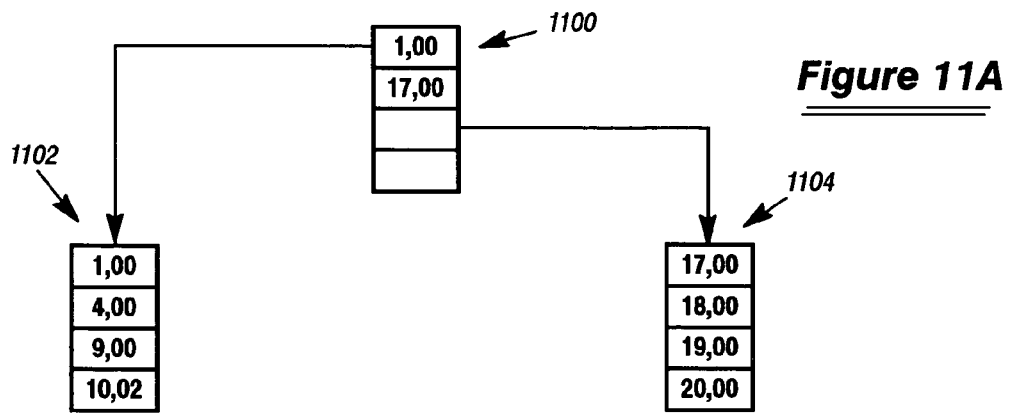
FIGS. 11A through 11D are tree diagrams illustrating insertion of a descending sequence of records into a tree that links leaf and non-leaf pages via the index values of first records on the leaf pages.
Figure 11B:
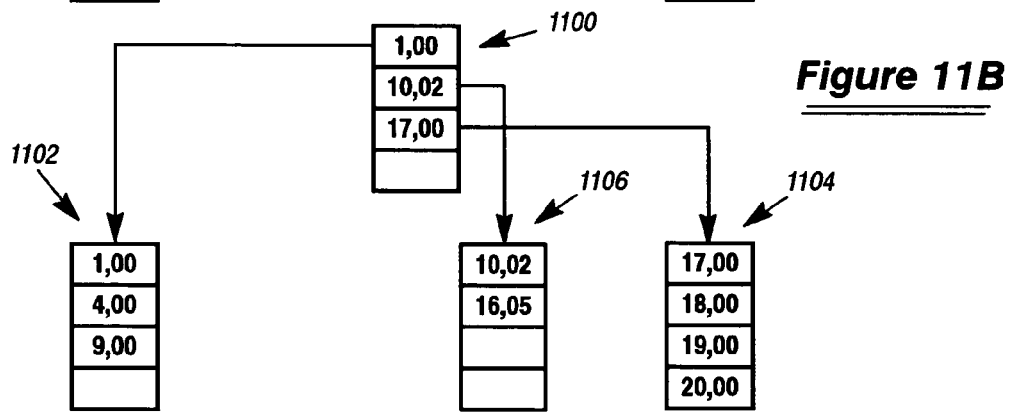

The tree of FIG. 11A includes a non-leaf page 1100 and two leaf pages 1102 and 1104. Assuming that the DBMS is in a sequence mode, receipt of a first record "16,05" in the sequence will be handled according to the guidelines discussed above. The insertion point for this record is at the end of page 1102. Therefore, the first guideline must be considered. If page 1102 is split at the insertion point and record "16,05" is stored on a new page, the index values "16,05" will be stored on non-leaf page 1100. This will prevent further records in the descending sequence from being copied to this new page. Therefore, the first guideline must be invoked such that the record "10,02" at the insertion edge of the page is copied to a new page 1106 to be stored with record "10,05", as shown in FIG. 11B. This allows additional records in the descending sequence to be stored on page 1106, as shown in FIG. 11C.

Figure 11C:
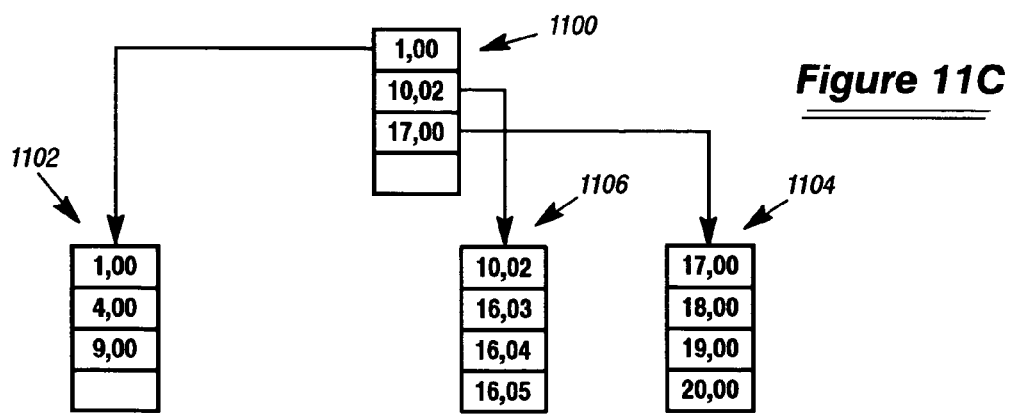
Figure 11D:
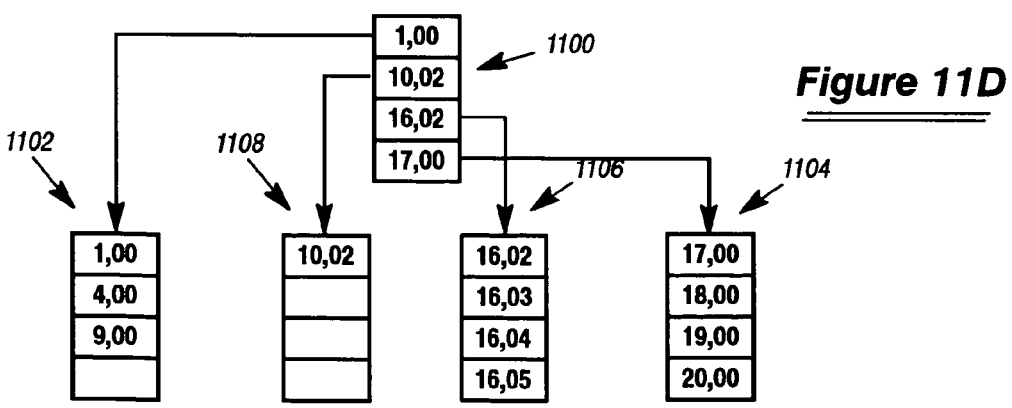

After page 1106 is full, as illustrated by FIG. 11C, assume a next record "16,02" is received. Because the insertion point is not at the edge of page 1106, the second guideline is considered. If page 1106 is split at the insertion point and record "16,02" is stored on the page with other records in the sequence, index values "16,02" will be copied to non-leaf page 1100. Thus, the second guideline should be invoked so that, if possible, record "16,02" and adjacent record "10,02" are maintained on the same page with other records in the sequence. However, page 1106 does not include enough storage space to store both records "16,02" and "10,02", so only record "16,02" is stored on this page 1106. The adjacent record "10,02" is stored on new page 1108. Additional records in the sequence may be added to page 1108, and the process may be repeated.

It may be appreciated that the current invention allows the type of sequence shown in FIGS. 11A through 11D to be handled in a manner that causes the load factor to trend towards 100%. This may be contrasted with the FIGS. 4A through 4C, which illustrates the same scenario being handled by a prior art method in a manner that trends the load factor towards zero.

As was described above, the scenario of FIGS. 11A through 11D was discussed as though DBMS was in a descending sequence mode. This type of mode could be entered because of information provided by a database administrator prior to the initiation of a load operation that will store a descending sequence. In another variation of the embodiment, the system may be allowed to automatically detect the descending sequence. In this implementation, the first record in the sequence will not be handled according to the guidelines discussed above. Instead, a new page will be created to store record "16,05" in the manner shown in FIG. 4A. However, when the next record "16,04" in the sequence is received, the descending sequence will be recognized, and page 1102 will be divided so that records "10,02" and "16,04" are on the same page in a manner similar to that shown in FIG. 11B. Thereafter, the sequence will be processed in a manner similar to that shown in FIGS. 11C and 11D. Thus, this alternative implementation utilizes an automated sequence detection mechanism that will result in non-optimal results for the first page split, but thereafter will produce a load factor trending towards 100%.

FIGS. 12A through 12D are tree diagrams illustrating the insertion of another descending sequence into the tree of FIG. 11A. As was the case in the example above, it will be assumed DBMS 106 is in a descending mode prior to the receipt of the first record.

Figure 12A:
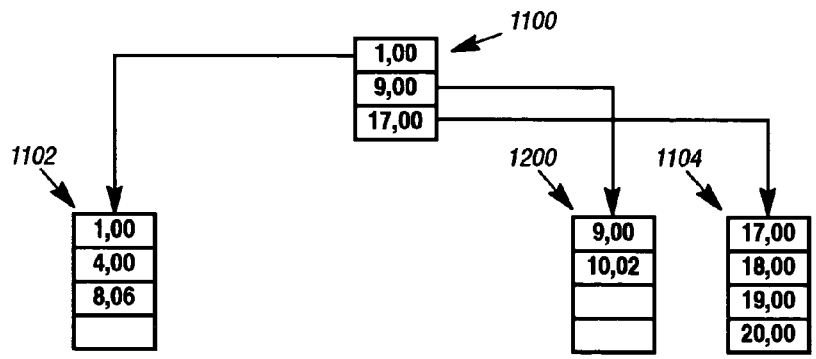
FIGS. 12A through 12D are tree diagrams illustrating the insertion of a second descending sequence of records into the tree of FIG. 11A according to the alternative embodiment.
Figure 12B:
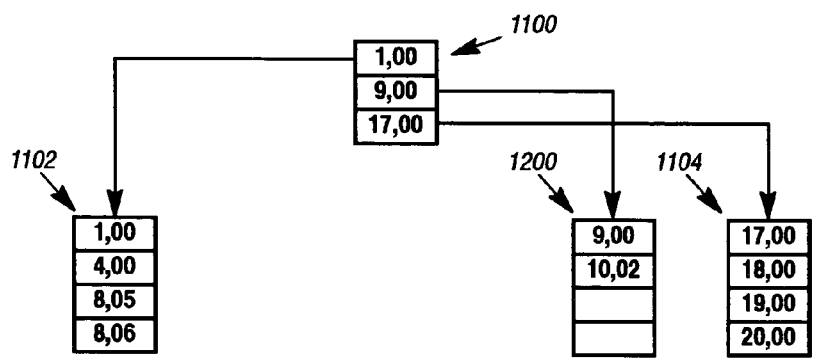

When the first record "8,06" of the sequence is received, the second guideline is considered since the insertion point is not at an end of page 1102 (FIG. 11A). It is determined whether, if this record were inserted at the insertion point on the same page as other records in the sequence, the index values for the record would be copied to non-leaf page 1100. In this situation, this is not the case. Therefore, the guideline need not be enforced. Page 1102 may simply be split at the insertion point, and record "8,06" is stored on page 1102. Records on the other side of the insertion point are stored on new page 1200. The next record "8,05 is the sequence may also be stored on this page when it is received, as shown in FIG. 12B.

When record "8,04" is received, the second guideline must again be considered. In this case, if page 1102 were split at the insertion point, the records in the sequence would be copied to a new page. If record "8,04" were stored on this new page with the other records in the sequence, the index values "8,04" for the new record would be stored within non-leaf page 1100. This would result in the undesirable situation wherein additional records in the sequence may not be stored on that new page. Therefore, the second guideline is triggered, and page 1102 is split so that adjacent record "4,00" will be stored with record "8,04" and other records in the sequence on new page 1202. This is show in FIG. 12C.

When an additional record "8,03" is received, the same analysis is performed with similar results. The second guideline is triggered, and an attempt is made to store both record "8,03" and adjacent record "4,00" on page 1202. However, because storage space will not permit this, only record "8,03" is stored on page 1202. It may be noted that if record "8,03" were a larger record such it could not be stored on page 1202 when the page split occurred, both records "4,00" and "8,03" would be stored to a new page.

Figure 12C:
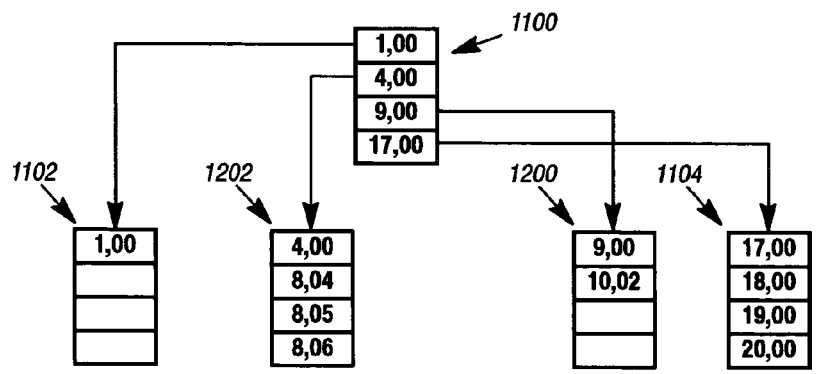
Figure 12D:
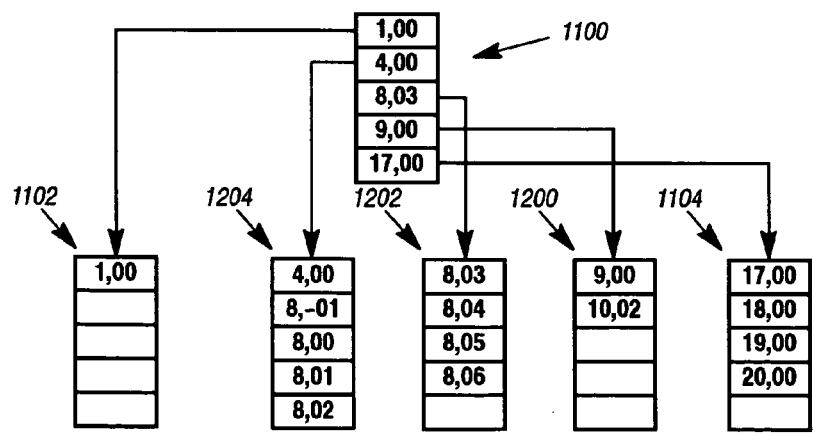

When page 1202 is divided, another page 1204 is created for record "4,00". This page is then available to receive additional records such as records "8,02" through "8,–01" as shown in FIG. 12D.

As was the case in the other examples above, FIGS. 12A through 12D illustrate that the current embodiment stores a sequence in a manner that allows the load factor to trend towards 100%. This may be contrasted with FIGS. 5A through 5C, which illustrates a similar scenario that is processed according to a prior art method, resulting in a decreased load factor.

Figure 13A:
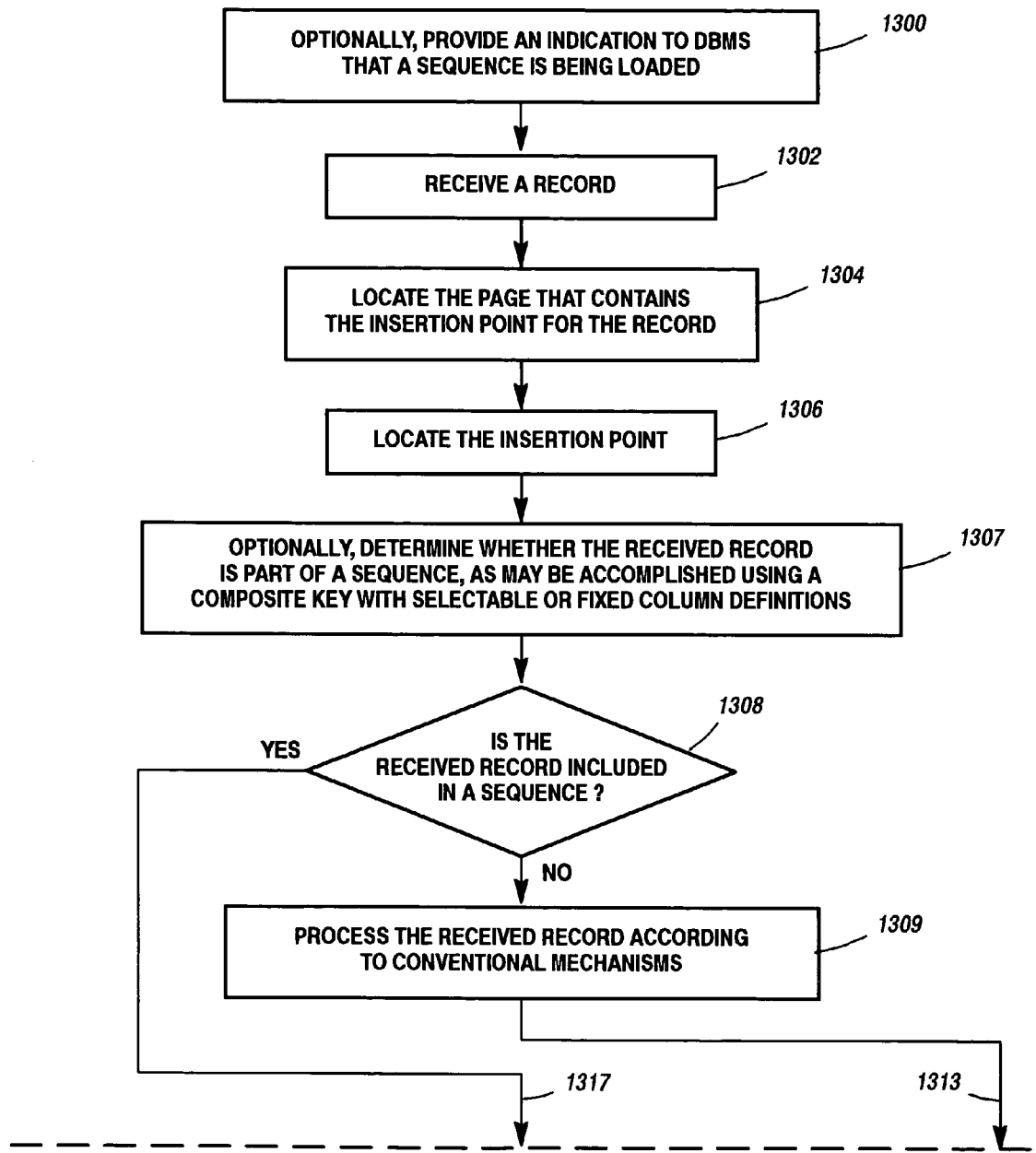
FIGS. 13A through 13C, when arranged as shown in FIG. 13, are a flow diagram illustrating the alternative embodiment of the invention.
Figure 13B:
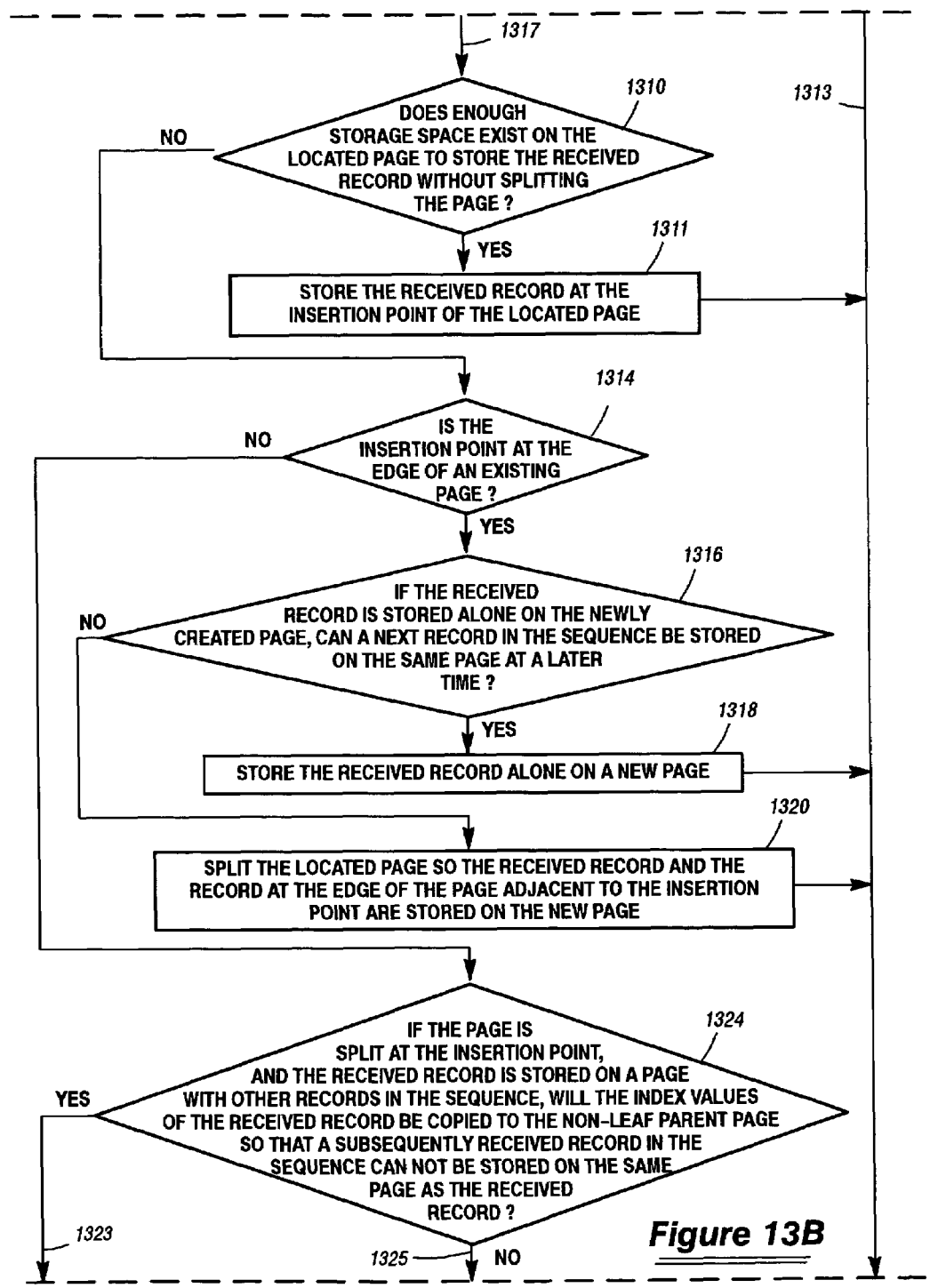
Figure 13C:
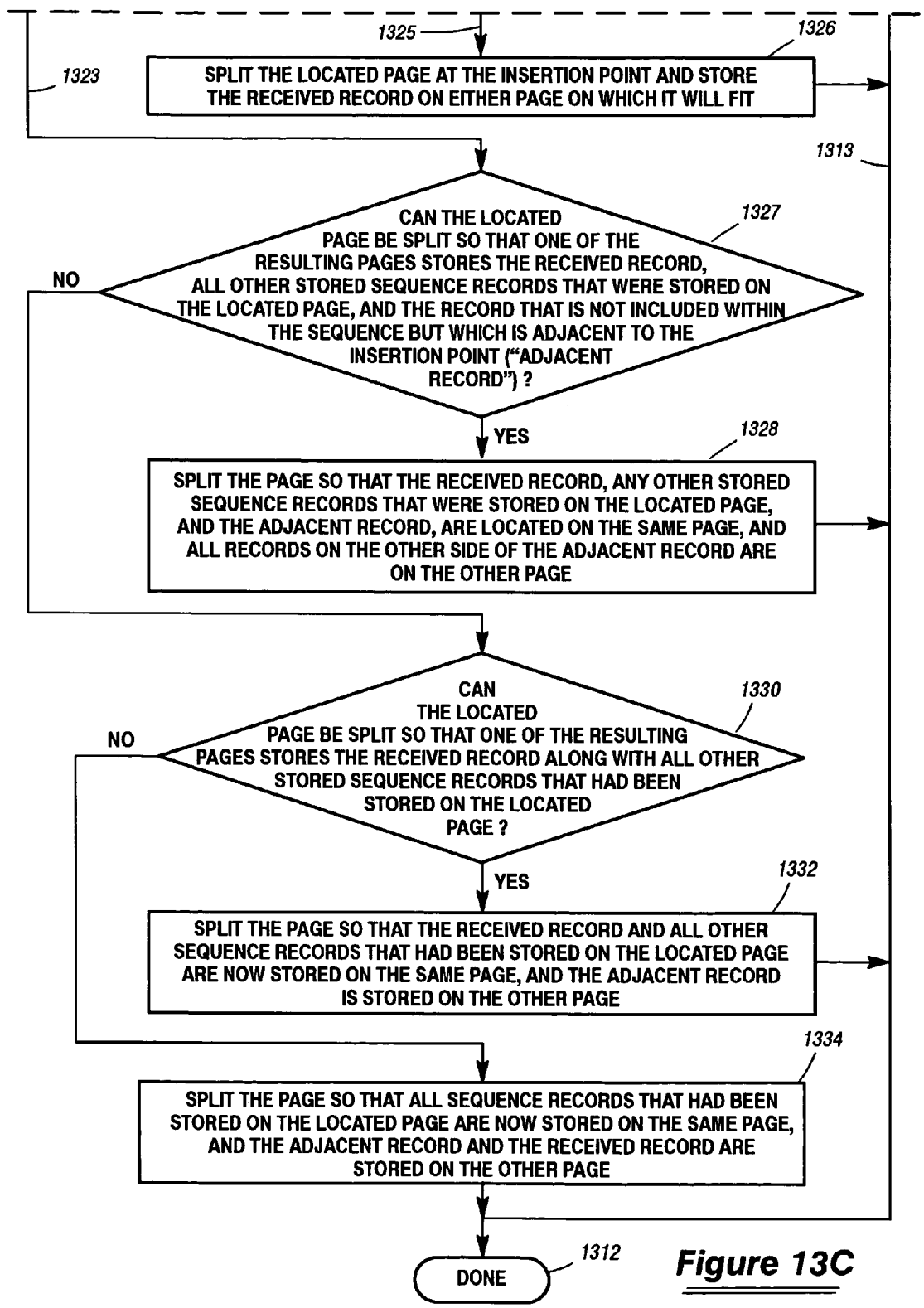

FIGS. 13A through 13C, when arranged as shown in FIG. 13, is a flow diagram illustrating the alternative embodiment of the invention. In a first optional step, human intervention may be provided to indicate that a sequence of records is being loaded (1300). The type of sequence, either descending or ascending, may also be indicated. Next, a record is received (1302). The page including the insertion point, as well as the insertion point itself, are located for this record (1304, 1306).

Next, if manual intervention is not being utilized to indicate the occurrence of a sequence, sequence detection may be performed by DBMS 106 (1307). This detection may be performed by comparing the index values of the received record with those stored within the records on either side of the insertion point. Alternatively, a sequence may be detected by comparing the index values of a received record to the index values obtained from the record most recently stored within the tree. In an embodiment utilizing a composite key, the varying segment may be used for this purpose. This composite key may be made programmably selectable, if desired, as will be discussed further below If a sequence is not detected (1308), the record is processed according to conventional means (1309), and processing is considered complete, as indicated by arrow 1313, which continues to FIG. 13C and completion indication 1312.

If a sequence is detected, processing continues from decision step 1308 to step 1310 of FIG. 13B, as indicated by arrow 1317. In step 1310, it is determined whether enough storage space exists on the located page to store the record without splitting the page. If so, the record is stored at the insertion point (1311). Processing continues to FIG. 13C, as indicated by arrow 1313, where execution is complete (1312).

If, in step 1310, the located page does not contain enough available storage space to store the record, division of the page is required. Processing continues to step 1314, where it is determined whether the insertion point is located at the edge of an existing page. If so, the first guideline discussed above is considered. It is assumed the new record will be stored alone on a newly created page. Then it is determined whether another subsequently received record in the sequence can also be stored on that new page (1316). If so, the new page is created to store the new record (1318). This completes processing, as indicated by arrow 1313 and completion indication 1312 of FIG. 13C.

If it is determined in step 1316 that if the new record is stored alone on a new page, a subsequently received record in the sequence cannot be stored with that record on the new page, processing continues to step 1320. The located page is split so that the new record and the record at the edge of the page adjacent the insertion point are stored on the newly created page. This allows the new page to store additional records in the sequence at a later time. This concludes processing, as indicated by arrow 1313 and completion indication 1312 of FIG. 13C.

Returning to step 1314 of FIG. 13B, if the insertion point is not located at the edge of an existing page, the second guideline discussed above is considered in step 1324. That is, it is first assumed that the located page is split at the insertion point, and the new record is stored on the page with other records in the sequence. It is then determined whether the index values of the new record will be copied to the parent non-index page (1324). If not, processing continues to step 1326 of FIG. 13C, as indicated by arrow 1325. In step 1326, the located page may be split at the insertion point, with the new record being stored on any of the resulting two pages on which it will fit. Preferably, the new record will be stored on the page with other records in the sequence to optimally increase the load factor. Processing is then considered complete (1312).

Returning to step 1324 of FIG. 13B, if an affirmative determination was made in this step, a page split at the insertion point will potentially create an undesirable situation wherein the page receiving the new record may be unable to receive additional records in the sequence, even though storage space is available to do so. Therefore, processing continues to step 1327 of FIG. 13C where the second guideline is triggered, as shown by arrow 1323.

In step 1327, a determination is made as to whether the page split can occur so that the new record is stored on a same page with other records in the sequence, as well as the record that is adjacent to the last stored record in the sequence and adjacent to the insertion point (i.e., the "adjacent record"). In other words, it is determined whether the page split can occur at the adjacent record so that the adjacent record is maintained with the sequence, and the records on the other side of the adjacent record are stored on the other page. If this is possible, the page is split in this manner so that the adjacent record, the new record, and other records in the sequence that were previously stored on the located page are now all stored on the same page (1328). Records to the other side of the adjacent record are stored on the other page that results from the page split. In some cases, this step will involve retaining the sequence and the adjacent record on the located page, as shown in FIG. 9C. In other cases, this will involve copying the adjacent record and records from the sequence to a newly created page, as shown in FIG. 12C. Processing is then completed (1312).

Returning to step 1327, it may not be possible to store both the adjacent record and the new record on the same page with other records in the sequence because of storage constraints. If this is the case, it must be determined whether it is possible to split the located page so that the new record can be stored with other records in the sequence that had been stored on the located page (1330). If so, the located page is split so that one of the resulting pages stores the new record along with other records in the sequence, and the other page stores the adjacent record and all records on the other side of the adjacent record (1332). Processing is then considered complete (1312). If, however, the located page does not have sufficient storage space available to store existing records in the sequence along with the new record, the page is split so that the new record and the adjacent record are stored on the same page, and other records in the sequence are stored on the other page (1334).

The foregoing description discusses several embodiments. In one embodiment illustrated in FIG. 8, an indication is provided to DBMS that a sequence of records is being provided. The length of the sequence is also indicated. In an alternative embodiment shown in FIG. 13, DBMS is informed that a sequence of records is about to be provided, although no sequence size is indicated. In still another embodiment discussed in reference to FIG. 13, DBMS automatically detects that a sequence of records is being received. These embodiments may be provided as user-selectable modes of the same system. In one case, DBMS operates in a default mode wherein sequence detection occurs automatically. The system enters an alternative mode based on the types of information provided by the operator. In another implementation, the operator must select the mode of operation to invoke the sequence processing method.

It may further be noted that all of the foregoing embodiments discuss the database tables as being $B^+$-trees. This need not be the case. The inventive system and method described herein may be adapted for use with other types of tree structures. For example, the inventive concepts may be used to insert records into the leaf or non-leaf nodes of a B-tree. In this alternative embodiment, if a record is being inserted into a non-leaf node of a B-tree that is already full, a child may be created for this non-leaf node using the guidelines discussed above. This is similar to the way in which a sibling is created for a leaf node of a $B^+$-tree when record insertion is attempted in a node having inadequate available storage space.

As another observation, the examples provided above describe records having two index values. When comparing contiguous records in the sequence, the first of the index values remains constant, whereas the second index value increases or decreases by one. It may be noted that other types of sequences may be considered, including those wherein the index values of contiguous records vary other than by the integral value of "one".

As previously discussed, the records included within the sequences of the foregoing examples each includes a composite key having a range segment and a varying segment. For a composite key that includes N indices, or "key columns", the range segment will include at least the first, or left-most, key column, and may include up to the N–1 key column. The values stored in the columns of the range segment do not vary between the records included within the sequence. In contrast, the varying segment includes all columns that are not included within the range segment. At the least, the varying segment includes column N, and at the most, it includes columns 2 through N. The values stored within the key columns of the varying segment do vary between the records in the sequence. The data type of the key columns may be any numeric or exact alphanumeric data type.

As may be appreciated, a sequence of records is sorted according to the varying segment. As discussed above in reference to FIGS. 7A through 7C, the illustrated sequence of records has a range segment having a single key column set to the value of "10". The varying segment varies between "02" and "–03". The varying segment may vary in an ascending or descending manner.

According to one embodiment, the columns in the range segment of the composite key are sequential columns. That is, the range segment may include columns 1 through 3, but may not include columns 1, 3, and 5. A similar restriction is placed on the varying segment. That is, the columns in the varying segment must be sequential columns. In another embodiment, this restriction need not be implemented.

In one embodiment, the varying columns need not be contiguous. For example, in the foregoing example, the sequence of records may include record "16,05", "16,03", and "16,02". This embodiment may be used when DBMS 106 is provided information in advance that a sequence of records is about to be received. It will be noted that if this type of a non-contiguous sequence is entered into the database table, a later received, intervening record such as record "16,04" cannot necessarily be inserted in the table such that the sequence load factor characteristics are retained. That is, the load factor characteristics described herein would only be obtained if the page containing the insertion point for the later received record includes available space for the record such that a page split operation is unnecessary. Moreover, this type of noncontiguous sequence cannot be used, with desirable load factor characteristics, if the system is operating in a mode wherein DBMS 106 is detecting the sequence.

In still another embodiment, the variations in the range segment may span multiple columns. For example, in a key having three columns storing integer values, with the last two being defined as the varying segment, an ascending sequence of records may include records "1,02,08", "1,02,09", and "1,03,00".

A user may be allowed to programmably define the range and varying segments. For example, a database administrator may be allowed to select those columns that will be included within the range and varying segments. This definition could be provided at the time the table is created, for example. The definition may be changed at any time by the database administrator.

Figure 14:
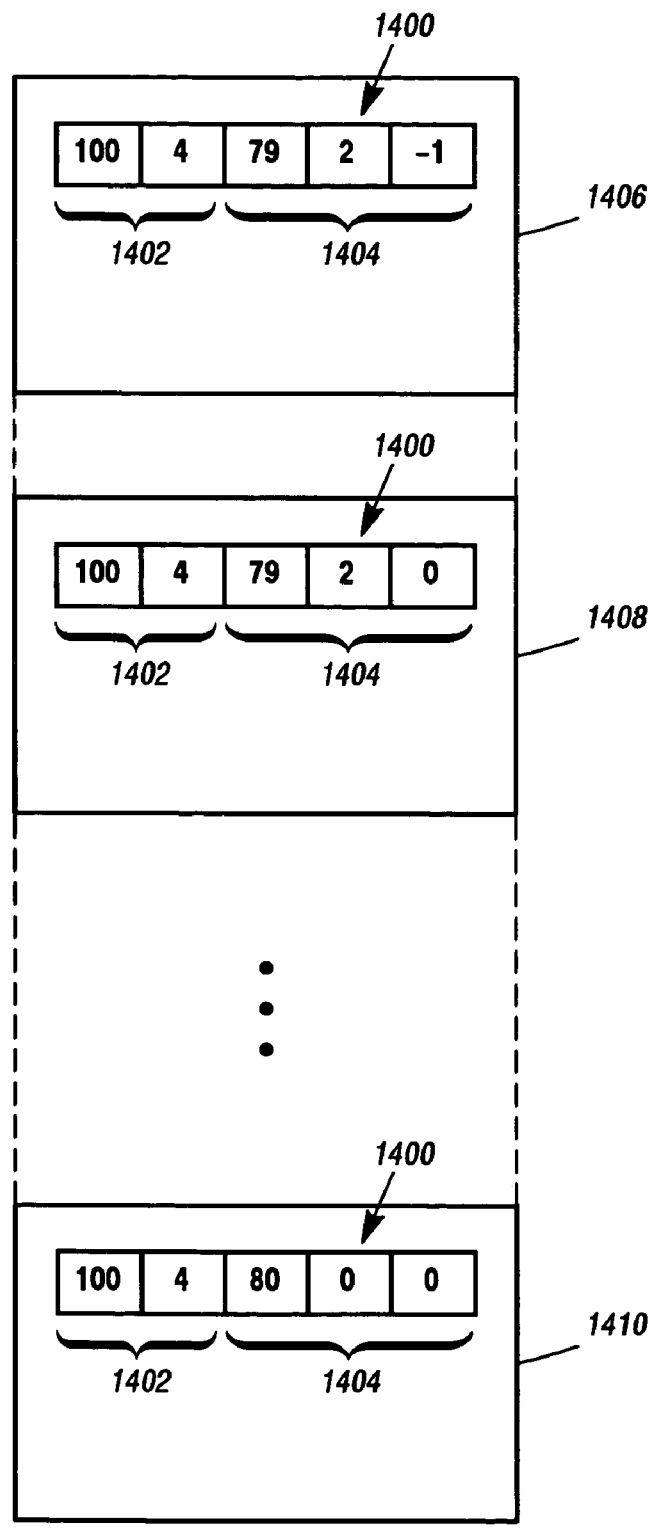
FIG. 14 is a block diagram illustrating an ascending sequence of records that each has a composite key.

FIG. 14 is a block diagram illustrating an ascending sequence of records that each has a composite key 1400. This composite key includes the range segment 1402 and varying segment 1404. Range segment 1402 includes the two leading key columns having values of "100, 04". These values remain constant for each of the records in the sequence. Varying segment 1404 includes the remaining three key columns. The values stored in these columns vary between the records included within the sequence. For example, varying segment 1404 of record 1406 includes the key values 79, 2, and –1. The varying segment 1404 of record 1408 includes the values 79, 2, and 0, and the varying segment 1404 of record 1410 includes the values 80, 0, and 0. In this example, the right-most key column of the varying segment varies between every record, the key column adjacent to the right-most key column varies the next most frequently, and so on, with the left-most column of the varying segment varying the least frequently. In other cases, the right-most column does not vary, but one or more other columns in the varying segment vary and thereby define the sequence.

In another embodiment of the invention, the range segment may be eliminated such that each record in a sequence includes only a varying segment. This embodiment may be employed in a scenario wherein non-contiguous records are stored within a database table, and an intervening sequence of records is inserted between two of these non-contiguous records.

The system and method of the current invention may be embodied in hardware, software, and/or firmware, or any combination thereof using a computer or other digital processing system. In view of all of these possible variations of inventive concepts, the breadth and scope of the present invention should not be limited by any of the above-described exemplary embodiments, but should be defined only in accordance with the following Claims and their equivalents.

The invention claimed is:

1. A computer-implemented method for inserting an ascending sequence of records into a tree structure having multiple nodes, comprising:
   a) receiving, with a processor, a record included in the ascending sequence of records;
   b) locating, with the processor, a node of the multiple nodes that includes an insertion point for the record, wherein the located node includes first, second and third sequentially-ordered records, wherein the first, second and third sequentially-ordered records are adjacent records within the located node, and wherein the insertion point lies between the first and second sequentially-ordered records;
   c) determining, with the processor, that the located node has insufficient storage space to store the record;
   d) based on the determination of insufficient storage space, determining whether dividing the located node at the insertion point will lower a load factor with the processor, wherein the load factor is a metric that measures overall usage of storage space within the tree structure;
   e) dividing, in response to determining that dividing the located node at the insertion point will lower the load factor of the tree structure, the located node into two nodes at a point between the second and third sequentially ordered records with the processor;
   f) storing, after the division of the located node into the two nodes, the first sequentially-ordered record, the record to be inserted and the second sequentially-ordered record on a first one of the two nodes resulting from the division of the located node with the processor to increase the load factor of the tree structure for ascending sequences of records; and
   g) storing the third sequentially-ordered record on a second one of the two nodes resulting from the division.

2. The method of claim 1, wherein determining whether dividing the located node at the insertion point lowers the load factor further comprises:
   determining, based on the determination that the insertion point is not located at an edge of the located node, whether dividing the located node at the insertion point will result in non-optimal storage of the sequence,
   the method further comprising:
   dividing, based on the determination that dividing the located node at the insertion point will result in optimal storage of the sequence, dividing the located node at the insertion point; and
   storing the record on either one of the two nodes having sufficient storage space available.

3. The method of claim 2, wherein determining whether dividing the located node at the insertion point will result in non-optimal storage of the sequence includes determining whether, if the record were stored on the same one of the two nodes as other records in the sequence, whether a searchable field of the record would be stored within another one of the multiple nodes included within the tree structure.

4. The method of claim 2,
   wherein storing the record comprises:
   determining that one of the two nodes stores previously stored records in the sequence;
   determining for the one of the two nodes that previously stored records in the sequence whether adequate storage space is available; and
   storing, based on the determination that adequate storage space is not available, the record on the other one of the two nodes,
   the method further comprising:
   identifying the second sequentially-ordered record that is not included in the sequence but that is adjacent to the insertion point; and
   storing the second sequentially-ordered record on whichever one of the two nodes stores the record if adequate storage space is available, and if not, storing the second sequentially-ordered record on the other one of the two nodes.

5. The method of claim 1, and further including processing the records of the sequence as the records of the sequence are being inserted into the tree to detect that the sequence is being received.

6. The method of claim 1, and further including obtaining information before receipt of any of the records of the sequence that the sequence will be inserted into the tree.

7. The method of claim 6, wherein obtaining the information includes processing all of the records of the sequence to determine a total size of the sequence.

8. The method of claim 7, wherein receiving the record in the sequence includes receiving all of the records in the sequence, and
   the method further includes:
   storing all of the records in the sequence on the located node if sufficient storage space is available on the located node, and if not, dividing the located node to form at least two nodes; and
   storing all of the records in the sequence on a same one of the at least two nodes if sufficient storage space is available on the same one of the at least two nodes, and if not, storing one or more of the records in the sequence on the same one of the at least two nodes with the second sequentially-ordered record.

9. A system for managing a tree structure that stores data records, comprising:
   a storage device for storing multiple pages included in the tree structure; and
   a processor coupled to the storage device to:
   receive a data record included within an ascending sequence of data records;
   locate a page of the multiple pages that includes an insertion point at which to store the data record based on a searchable field in the data record, wherein the located page includes first, second and third sequentially-ordered data records, wherein the first, second and third sequentially-ordered data records are adjacent data records within the page, and wherein the insertion point lies between the first and second sequentially-ordered data records;
   determine whether the located page includes insufficient storage space to store the data record;
   based on the determination of insufficient storage space, determine whether dividing the located page at the insertion point will lower a load factor of the tree structure, wherein the load factor is a metric that measures overall usage of storage space within the tree structure;
   divide, in response to the determination that dividing the located page at the insertion point will lower the load factor of the tree structure, the located page into two pages at a point between the second and third sequentially-ordered data records;
   store, after the division of the located page into the two pages, the first sequentially-ordered data record, the data record to be inserted and the second sequentially-ordered data record to a same one of the two pages to increase the load factor of the tree structure for ascending sequences of records; and store the third sequentially-ordered record on a second one of the two pages resulting from the division.

10. The system of claim 9 wherein the processor executes software means for dividing the located page so that the data record is stored on a same one of the at least two pages with any other previously received data records in the sequence if storage space is available, and if not, for storing the data record on another one of the at least two pages.

11. The system of claim 10, wherein the software means further includes means for determining whether, if the page storing the data record has adequate storage space available, any subsequently received data records in the sequence would still be prevented from being stored on the page storing the data record, and if so, for storing the second sequentially-ordered data record on the page storing the data record if storage space permits.

12. The system of claim 9, wherein the processor executes software means for obtaining information indicative of the sequence prior to the time data records in the sequence are obtained for storage in the tree structure.

13. The system of claim 12, wherein the information includes size information indicative of total size of the sequence, and wherein the software means includes:
means for determining, based on the size information, whether all data records in the sequence can be stored at the insertion point without dividing the located page, and if so, for storing all data records in the sequence on the located page, and if not, for dividing the located page into at least two pages at the insertion point;
means for storing all data records in the sequence on one of the at least two pages if storage space is available, and if not, for storing all data records in the sequence on multiple ones of the at least two pages; and
means for storing the second sequentially-ordered data record on the same one of the at least two pages as the last-received data record.

14. The system of claim 12, wherein the tree structure represents a database table, and wherein the software means is included within a database management system.

15. A system for managing records of a database table that is represented by a tree structure having multiple nodes, comprising:
a storage device for storing multiple nodes included in the tree structure;
a processor coupled to the storage device;
means for receiving a record that is part of an ascending sequence of data records;
means for locating a node of the multiple nodes of the tree structure that includes an insertion point for the record at which to store the record based on a searchable field in the record, wherein the first, second and third sequentially-ordered data records are adjacent data records within the page and wherein the insertion point lies between the first and second sequentially-ordered records;
means for determining whether the located node includes insufficient storage space to store the data record;
means for determining based on the determination of insufficient storage space whether dividing the located node at the insertion point will lower a load factor of the tree structure, wherein the load factor is a metric that measures overall usage of storage space within the tree structure;
means for dividing, in response to the determination that dividing the located node at the insertion point will lower the load factor of the tree structure, the located node into two nodes at a point between the second and third sequentially-ordered records;
means for storing, after the division of the located node into the two pages, the first sequentially-ordered record, the record to be inserted and the second sequentially-ordered record to a same one of the two pages to increase the load factor of the tree structure for ascending sequences of records; and
means for storing the third sequentially-ordered record on a second one of the two pages resulting from the division.

16. The system of claim 15, including means for dividing the located node so that the received record is maintained on a same one of the resulting nodes as any other stored records in the sequence if storage space is available, and if not, for storing the received record on a different one of the resulting nodes as compared to the node storing other records in the sequence;
means for identifying the second sequentially-ordered record; and
means for determining whether, assuming storage space is available, it is possible to store a subsequently received record in the sequence on the same node as the received record, and it not, for storing the second sequentially-ordered record on the same node as the received record if available storage space permits.

17. The system of claim 16, and wherein the determining means of claim 16 includes means for determining whether the received record, if stored on a same one of the nodes as other stored records in the sequence, will be identified by identifying data stored within a different node of the tree structure.

18. The system of claim 15, wherein the tree structure is selected from a group consisting of a B-tree and a B$^+$-tree.

19. The system of claim 15, and further including means for determining whether a sequence of records is being received.

20. The system of claim 19, further including:
means for determining the size of the sequence before any record in the sequence is inserted into the tree structure;
means for determining whether the located node must be divided to store all records in the sequence, and if a node division is necessary, for dividing the node and storing all records in the sequence on a node resulting from the division if storage space is available, and otherwise for storing the records in the sequence on at least two nodes; and
means for storing the second sequentially-ordered record on the same node with all records in the sequence if storage space is available, and otherwise for storing the second sequentially-ordered record on whichever one of the at least two node stores the last received record in the sequence.

21. The system of claim 15, further including means for interpreting a composite key having a range segment and a varying segment to determine that a the ascending sequence of records is being received.

22. The system of claim 21, further including means for programmably selecting the range segment and the varying segment.

23. A computer-readable storage medium comprising instructions that cause a processor to insert an ascending sequence of records into a tree structure having multiple nodes, wherein the instruction further cause the processor to:
a) receive a record included in the ascending sequence of records;

b) locate a node of the multiple nodes that includes an insertion point for the record, wherein the located node includes first, second, and third sequentially-ordered records, and wherein the first, second and third sequentially-ordered records are adjacent within the located node, and wherein the insertion point lies between the first and second sequentially-ordered records;

c) determine that the located node has insufficient storage space to store the record to be inserted;

d) based on the determination of insufficient storage space, determine whether dividing the located node at the insertion point will lower a load factor of the tree structure, wherein the load factor is a metric that measures overall usage of storage space within the tree structure;

e) in response to determining that dividing the located node at the insertion point will increase the load factor of the tree structure, divide the located node into two nodes at a point between the second and third sequentially ordered records f) store, after the division of the located node into two nodes, the first sequentially-ordered record, the record to be inserted and the second sequentially-ordered record on a first one of the two nodes resulting from the division of the located node to increase the load factor of the tree structure for ascending sequences of records; and g) store the third sequentially-ordered record on a second one of the two nodes resulting from the division.

* * * * *